(12) United States Patent
Horihata et al.

(10) Patent No.: US 11,982,539 B2
(45) Date of Patent: May 14, 2024

(54) DISPLAY SYSTEM, DISPLAY CONTROL DEVICE, AND DISPLAY CONTROL PROGRAM PRODUCT

(71) Applicant: DENSO CORPORATION, Kariya (JP)

(72) Inventors: Satoshi Horihata, Kariya (JP); Kazuki Kojima, Kariya (JP); Akira Kamiya, Kariya (JP); Motohiro Fukumoto, Kariya (JP); Takeshi Hato, Kariya (JP)

(73) Assignee: DENSO CORPORATION, Kariya (JP)

( * ) Notice: Subject to any disclaimer, the term of this patent is extended or adjusted under 35 U.S.C. 154(b) by 359 days.

(21) Appl. No.: 17/374,044

(22) Filed: Jul. 13, 2021

(65) Prior Publication Data

US 2021/0356289 A1   Nov. 18, 2021

Related U.S. Application Data

(63) Continuation of application No. PCT/JP2019/050352, filed on Dec. 23, 2019.

(30) Foreign Application Priority Data

Jan. 16, 2019 (JP) ................................ 2019-005543
Sep. 30, 2019 (JP) ................................ 2019-178859

(51) Int. Cl.
*G01C 21/36* (2006.01)

(52) U.S. Cl.
CPC ....... *G01C 21/3644* (2013.01); *G01C 21/365* (2013.01)

(58) Field of Classification Search
CPC .......................... G01C 21/3644; G01C 21/365
See application file for complete search history.

(56) References Cited

U.S. PATENT DOCUMENTS

| 10,006,505 | B2 * | 6/2018 | Lemay | ............... G01C 21/3626 |
| 10,422,654 | B2 * | 9/2019 | Moore | ................... G01C 21/36 |
| 2009/0037103 | A1 * | 2/2009 | Herbst | ............... G06Q 30/0251 701/439 |
| 2012/0059720 | A1 * | 3/2012 | Musabji | ............. G01C 21/3647 701/527 |

(Continued)

FOREIGN PATENT DOCUMENTS

| JP | 2010236915 A | 10/2010 |
| JP | 2018127204 A | 8/2018 |

(Continued)

*Primary Examiner* — Seth A Silverman
(74) *Attorney, Agent, or Firm* — Harness, Dickey & Pierce, P.L.C.

(57) ABSTRACT

A display system applied to a vehicle includes a navigation device guiding a route to a destination and a display control device displaying multiple route guidance contents in superimposed manner on a road surface using a head-up display. When the navigation device determines that a first route guidance and a second route guidance included in route guidance information are successive guidance, (i) the navigation device concurrently displays images of the first route guidance and the second route guidance, and (ii) the display control device activates display of a first guidance content that performs the first route guidance, and then activates display of a second guidance content that performs the second route guidance after deactivating the display of the first guidance content.

13 Claims, 16 Drawing Sheets

(56) References Cited

U.S. PATENT DOCUMENTS

2016/0327402 A1  11/2016  Funabiki et al.

FOREIGN PATENT DOCUMENTS

| JP | 2018128466 A | 8/2018 |
| JP | 2019206256 A | 12/2019 |
| WO | WO-2013046424 A1 | 4/2013 |
| WO | WO-2015118859 A1 | 8/2015 |

* cited by examiner

FIG. 11 COMPARATIVE EXAMPLE
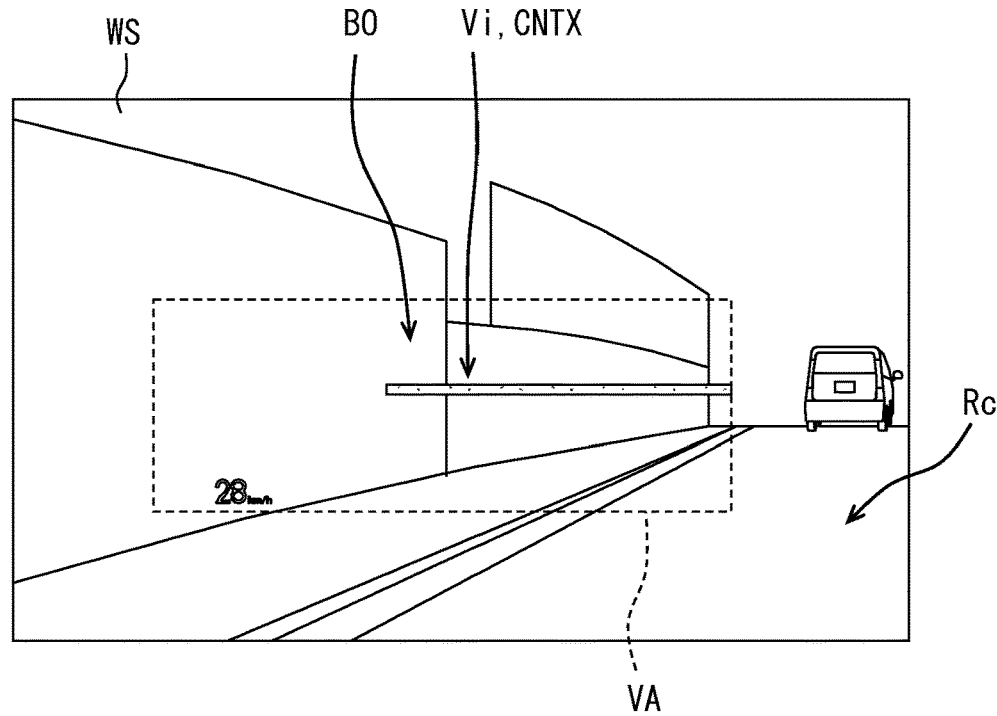
FIG. 12
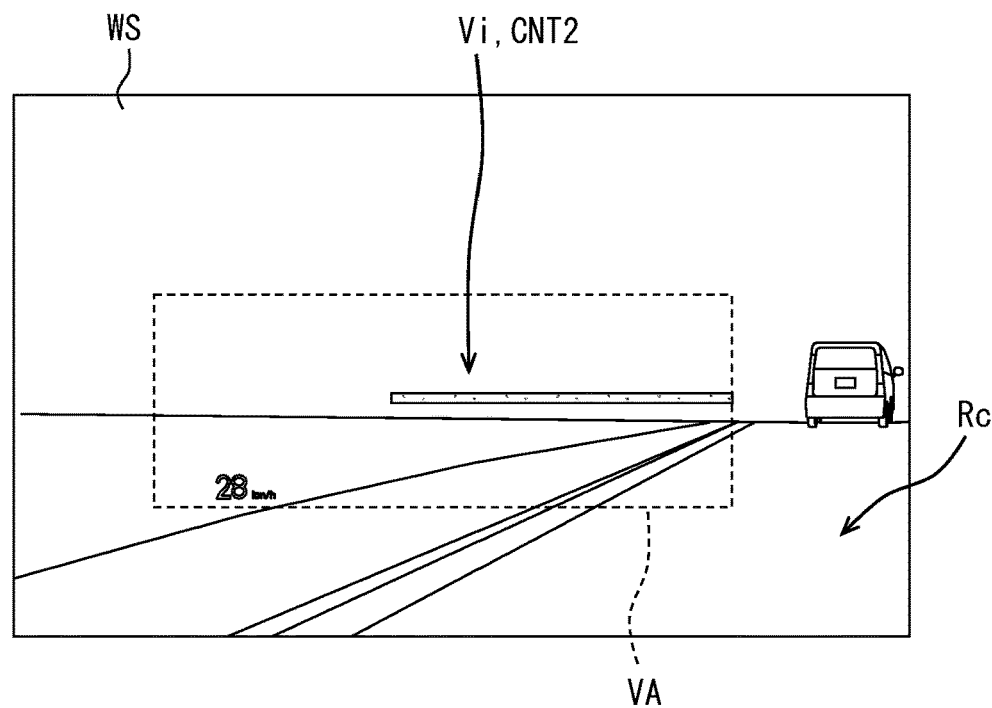

DISPLAY SYSTEM, DISPLAY CONTROL DEVICE, AND DISPLAY CONTROL PROGRAM PRODUCT

CROSS REFERENCE TO RELATED APPLICATION

The present application is a continuation application of International Patent Application No. PCT/JP2019/050352 filed on Dec. 23, 2019, which designated the U.S. and claims the benefit of priority from Japanese Patent Application No. 2019-005543 filed on Jan. 16, 2019 and Japanese Patent Application No. 2019-178859 filed on Sep. 30, 2019. The entire disclosures of all of the above applications are incorporated herein by reference.

TECHNICAL FIELD

The present disclosure relates to a display system, a display control device, and a display control program product.

BACKGROUND

There has been known a vehicle display device that displays a route guidance in an overlapped manner on a front view of a driver using a head-up display.

SUMMARY

The present disclosure provides a display system applied to a vehicle. The display system includes: a navigation device guiding a route to a destination; and a display control device displaying multiple route guidance contents in superimposed manner on a road surface using a head-up display. When the navigation device determines that a first route guidance and a second route guidance included in route guidance information are successive guidance, (i) the navigation device concurrently displays images of the first route guidance and the second route guidance, and (ii) the display control device activates display of a first guidance content that performs the first route guidance, and then activates display of a second guidance content that performs the second route guidance after deactivating the display of the first guidance content.

BRIEF DESCRIPTION OF DRAWINGS

Objects, features and advantages of the present disclosure will become apparent from the following detailed description made with reference to the accompanying drawings. In the drawings:

FIG. 11 is a diagram showing a comparative example in which a display start of second guidance content is not appropriate;

FIG. 12 is a diagram showing an effect of early display start of second guidance content in a case where no shield exists in a roadside area of connected road;

DETAILED DESCRIPTION

Figure 1:
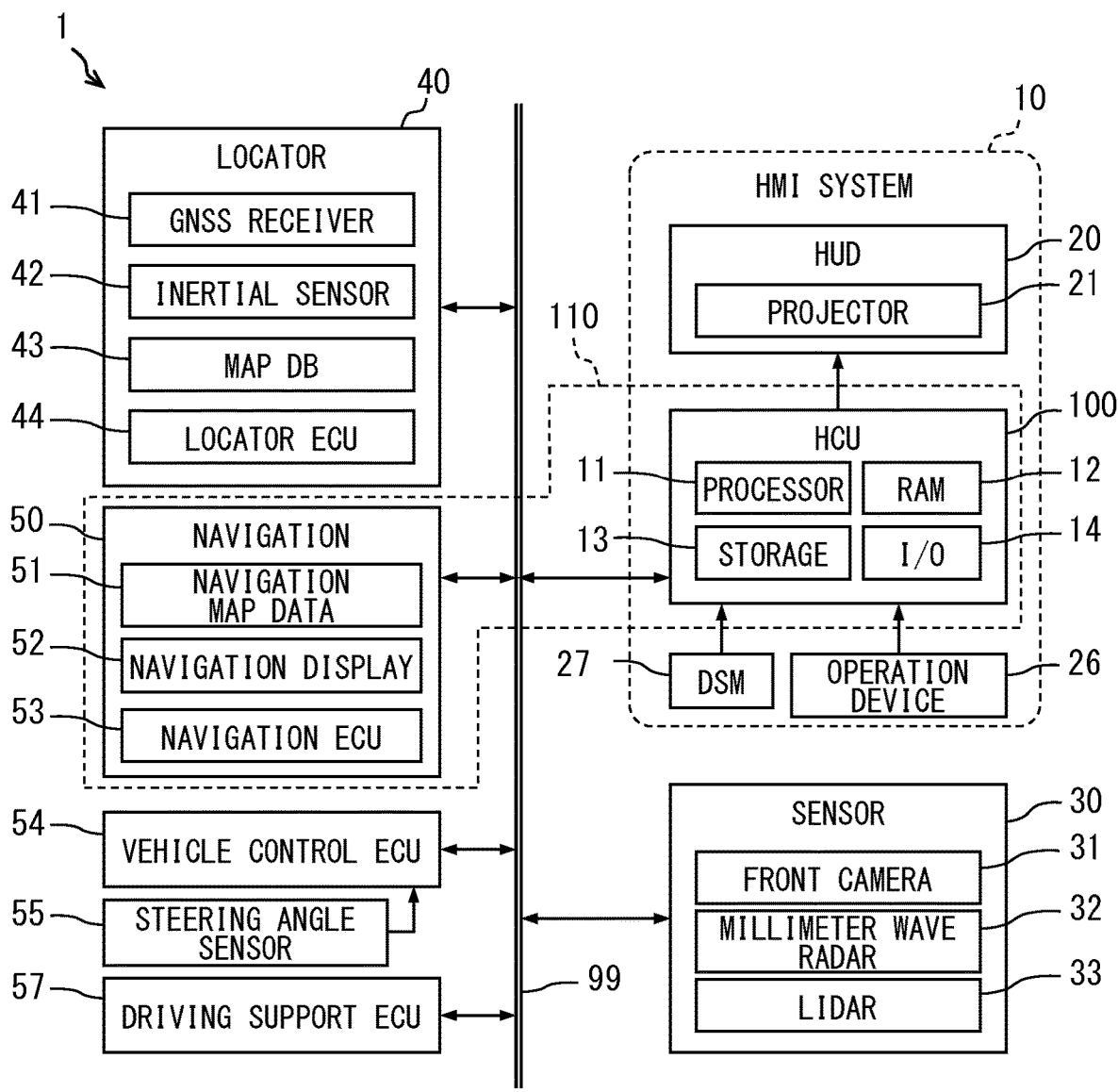
FIG. 1 is a diagram showing an overall configuration of an in-vehicle network including an HCU according to an embodiment of the present disclosure.

Before describing embodiments of the present disclosure, a known art of a vehicle display device will be described. There has been known a vehicle display device that displays a route guidance to a destination in an overlapped manner on a front view of a driver so that the route guidance can be seen through a windshield of a vehicle. When the vehicle approaches an intersection where the vehicle is able to make a right turn or left turn, at a position prior to the intersection by a predetermined distance, the vehicle display device displays, as a guidance image, an arrow indicating a turning direction at the intersection in an overlapped manner on the road according to route information.

In the above-described route guidance to the destination, when successive guidance points each of which requires the display of guidance image exist along the route, successive display of guidance images need to be performed. When performing the successive guidance display, it is hard to display a first route guidance image and second route guidance image in an easy-understanding manner.

According to an aspect of the present disclosure, a display system applied to a vehicle includes: a navigation device guiding a route to a destination; and a display control device displaying, based on route guidance information acquired from the navigation device, a plurality of route guidance contents by superimposing the plurality of route guidance contents on a road surface with a head-up display. The route guidance information acquired from the navigation device includes a first route guidance and a second route guidance. The plurality of route guidance contents include a first guidance content corresponding to the first route guidance and a second guidance content corresponding to the second route guidance. When the navigation device determines that the first route guidance and the second route guidance are successive guidance, the navigation device concurrently activates a display of a first guidance image corresponding to the first route guidance and a display of a second guidance image corresponding to the second route guidance. When the navigation device determines that the first route guidance and the second route guidance are successive guidance, the display control device, using the head-up display: (i) activates a display of the first guidance content that performs the first route guidance; (ii) deactivates the display of the first guidance content; and then (iii) activates a display of the second guidance content that performs the second route guidance.

According to another aspect of the present disclosure, a display system applied to a vehicle includes: a navigation device guiding a route to a destination; and a display control device displaying, based on route guidance information acquired from the navigation device, a plurality of route guidance contents by superimposing the plurality of route guidance contents on a road surface with a head-up display. The route guidance information acquired from the navigation device includes a first route guidance and a second route guidance. The plurality of route guidance contents include a first guidance content corresponding to the first route guidance and a second guidance content corresponding to the second route guidance. When the navigation device determines that the first route guidance and the second route guidance are successive guidance, the navigation device concurrently starts the first route guidance and the second route guidance. A guidance target of the second route guidance corresponds to a second guidance point. When the navigation device determines that the first route guidance and the second route guidance are successive guidance, the display control device: (i) activates a display of the first guidance content that performs the first route guidance; (ii) deactivates the display of the first guidance content; and then (iii) activates a display of the second guidance content that performs the second route guidance under a condition that a travelling direction of the vehicle is determined to face a direction along which a road extends toward the second guidance point.

According to another aspect of the present disclosure, a display system applied to a vehicle includes: a navigation device guiding a route to a destination; and a display control device displaying, based on route guidance information acquired from the navigation device, a plurality of route guidance contents by superimposing the plurality of route guidance contents on a road surface with a head-up display. The route guidance information acquired from the navigation device includes a first route guidance and a second route guidance. The plurality of route guidance contents include a first guidance content corresponding to the first route guidance and a second guidance content corresponding to the second route guidance. When the navigation device determines that the first route guidance and the second route guidance are successive guidance, the navigation device concurrently starts the first route guidance and the second route guidance. When the navigation device determines that the first route guidance and the second route guidance are successive guidance, the display control device: (i) activates a display of the first guidance content that performs the first route guidance; (ii) deactivates the display of the first guidance content; and then (iii) activates a display of the second guidance content that performs the second route guidance. When a type of a road corresponding to the route guidance is a specific type road, the display control device activates the display of the second guidance content before deactivating the display of the first guidance content.

According to another aspect of the present disclosure, a display control device, which is applied to a vehicle equipped with a navigation device and controls a superimposed display of a content on a road surface using a head-up display, includes: a route information acquisition unit acquiring route guidance information from the navigation device of the vehicle, the navigation device providing a route guidance to a destination, the route guidance information acquired from the navigation device including a first route guidance and a second route guidance; and a display control unit displaying a plurality of route guidance contents generated based on the route guidance information by superimposing the plurality of route guidance contents on the road surface using the head-up display, the plurality of route guidance contents including a first guidance content corresponding to the first route guidance and a second guidance content corresponding to the second route guidance. When the navigation device determines that the first route guidance and the second route guidance are successive guidance, (i) the navigation device concurrently activates a display of a first guidance image corresponding to the first route guidance and a display of a second guidance image corresponding to the second route guidance, and (ii) the route information acquisition unit acquires the route guidance information that indicates an existence of the successive guidance. In response to the route information acquisition unit acquiring the route guidance information indicating the existence of the successive guidance, within a successive guidance area where the navigation device concurrently displays the first guidance image and the second guidance image, the display control unit: (i) activates a display of the first guidance content that performs the first route guidance, (ii) deactivates the display of the first guidance content; and then (iii) activates a display of the second guidance content that performs the second route guidance.

According to another aspect of the present disclosure, a display control device, which is applied to a vehicle equipped with a navigation device and controls a superimposed display of a content on a road surface using a head-up display, includes: a route information acquisition unit acquiring route guidance information from the navigation device of the vehicle, the navigation device providing a route guidance to a destination, the route guidance information acquired from the navigation device including a first route guidance and a second route guidance; and a display control unit displaying a plurality of route guidance contents generated based on the route guidance information by superimposing the plurality of route guidance contents on the road surface using the head-up display, the plurality of route guidance contents including a first guidance content corresponding to the first route guidance and a second guidance content corresponding to the second route guidance. A guidance target of the second route guidance corresponds to a second guidance point. When the navigation device determines that the first route guidance and the second route guidance are successive guidance, (i) the navigation device concurrently starts the first route guidance and the second route guidance, and (ii) the route information acquisition unit acquires the route guidance information that indicates an existence of the successive guidance. In response to the route information acquisition unit acquiring the route guidance information indicating the existence of the successive guidance, within a successive guidance area where the navigation device concurrently starts the first route guidance and the second route guidance, the display control unit: (i) activates a display of the first guidance content that performs the first route guidance, (ii) deactivates the display of the first guidance content; and then (iii) activates a display of the second guidance content that performs the second route guidance under a condition that a travelling direction of the vehicle is determined to face a direction along which a road extends toward the second guidance point.

According to another aspect of the present disclosure, a display control program product stored in a computer-readable non-transitory storage medium is provided. The display control program product is applied to a vehicle which is equipped with a navigation display, and controls a superimposed display of a content on a road surface using a head-up display. The display control program product includes instructions to be executed by a processor for controlling the display control device to execute the above-described operations.

In the above described navigation device or navigation display, the first route guidance and the second route guidance are concurrently started. Thus, the successive guidance can be notified to the user in advance by the navigation device or the navigation display. The head-up display can provide information related to each guidance point included in the route guidance. Specifically, until the display of first guidance content related to the first guidance point is deactivated, the display of second guidance content related to the second guidance point is in a standby state. As described above, by successively displaying the first guidance content and the second guidance content, each of the successive guidance can be displayed in an overlapped manner to the user in an easy-understanding way.

Figure 2:
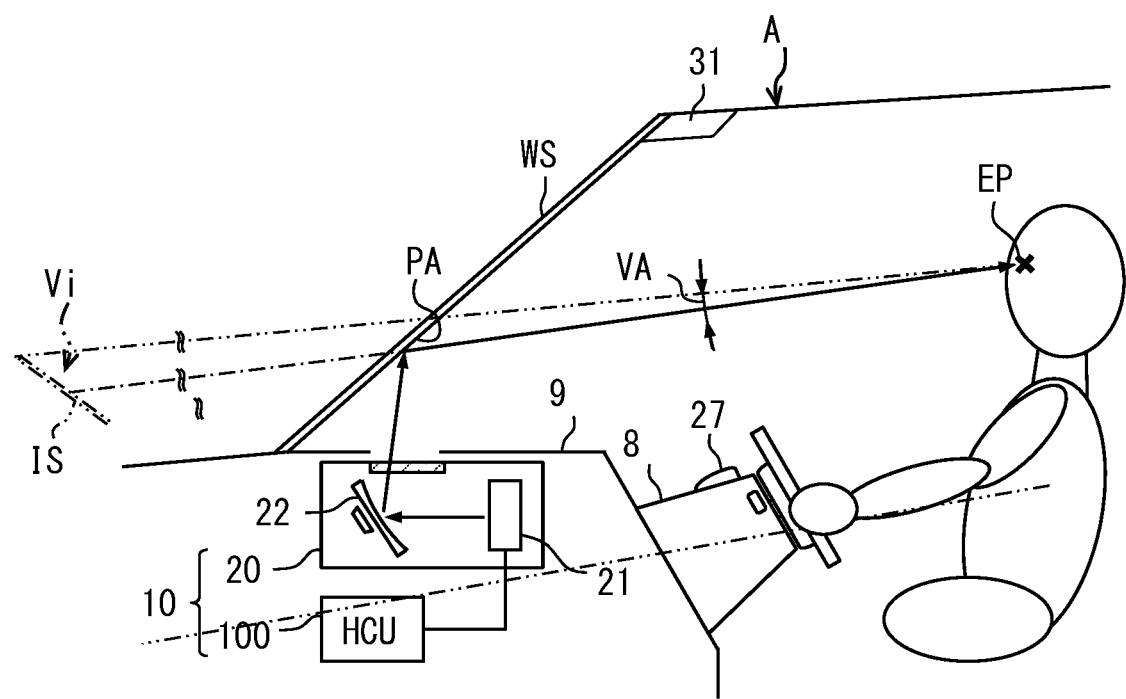
FIG. 2 is a diagram showing an example of an on-board HUD device.

Functions of a display control device according to an embodiment of the present disclosure is provided by a human machine interface (HMI) control unit 100 shown in FIG. 1 and FIG. 2. Hereinafter, the HMI control unit 100 is also referred to as an HCU 100. The HCU 100 includes an HMI system 10 used in a vehicle A and a head-up display (hereinafter referred to as HUD) device 20. The HMI system 10 includes an operation device 26 and a driver status monitor (DSM) 27. The HMI system 10 has an input interface function that accepts an operation made by an occupant (for example, a driver) of the vehicle A, and an output interface function that presents information to the driver.

The HMI system 10 is communicably connected to a communication bus 99 of an in-vehicle network 1 mounted on the vehicle A. The HMI system 10 is one of multiple nodes included in the in-vehicle network 1. For example, a peripheral monitoring sensor 30, a locator 40, a navigation device 50, a vehicle control electronic control unit 54, a driving support electronic control unit 57 are connected to the communication bus 99 of the in-vehicle network 1 as nodes. Hereinafter, electronic control unit is also referred to as ECU for simplification. These nodes connected to the communication bus 99 are configured to communicate with one another.

In the following description, a front-rear direction and a left-right directions are defined with reference to the vehicle A placed on a horizontal plane. Specifically, the front-rear direction is defined along a longitudinal direction of the vehicle A. The left-right direction is defined along a width direction of the vehicle A.

The peripheral monitoring sensor 30 is an autonomous sensor that monitors a peripheral environment of the vehicle A. The peripheral monitoring sensor 30 detects, from a detection range around the vehicle, moving objects such as other vehicles, pedestrians, cyclists, non-human animals and the like, and stationary objects such as roadside structures, falling objects on the road, guardrails, curbs, and road markings such as traveling lane markings. The peripheral monitoring sensor 30 provides the detection information indicating detection of an object around the vehicle A (particularly in a front range) to the driving support ECU 57 and the HCU 100 via the communication bus 99.

The peripheral monitoring sensor 30 includes, as a detection configuration for object detection, a front camera 31, a millimeter wave radar 32, and a laser imaging detection and ranging (Lidar) 33. The front camera 31 outputs, as detection information, at least one of image data obtained by photographing the front range of the vehicle A or an analysis result of the image data. The millimeter wave radar 32 irradiates a millimeter wave or a quasi-millimeter wave toward the Front Range, and generates detection information to be output to the external devices by a process of receiving a reflected wave reflected by a moving object, a stationary object, or the like. The Lidar 33 irradiates laser beam toward the Front Range, and generates detection information to be output to the external devices by a process of receiving a reflected laser beam reflected by a moving object, a stationary object, or the like.

The locator 40 generates highly accurate position information of the vehicle A by a complex positioning method that combines multiple types and pieces of acquired information. The locator 40 can specify a travelling lane in which the vehicle A is travelling among multiple lanes. The locator 40 includes a global navigation satellite system (GNSS) receiver 41, an inertial sensor 42, a high-precision map database (hereinafter referred to as DB) 43, and a locator ECU 44.

The GNSS receiver 41 receives positioning signals transmitted from multiple artificial satellites, such as positioning satellites. The GNSS receiver 41 is capable of receiving positioning signals from respective positioning satellites of at least one satellite positioning system among multiple satellite positioning systems such as GPS, GLONASS, Galileo, IRNSS, QZSS, and Beidou.

The inertial sensor 42 includes, for example, a gyro sensor and an acceleration sensor. The high-precision map DB 43 includes a non-volatile memory, and stores map data (hereinafter referred to as high-precision map data) with higher accuracy than that used in the navigation device 50 in the memory. The high-precision map data includes information on lane markings and road surface markings, three-dimensional shape information of structures in roadside areas, number and three-dimensional shape information of road lanes, and the like.

The locator ECU 44 includes a microcomputer, and the microcomputer includes a processor, a RAM, a storage unit, an input output interface, a bus connecting these components. The locator ECU 44 combines positioning signal received by the GNSS receiver 41, measurement result of the inertial sensor 42, vehicle speed information output to the communication bus 99, and the like, and successively specifies a position and a travelling direction of the own vehicle A. The locator ECU 44 provides position information and direction information of the own vehicle A, which are specified based on the positioning result, to the navigation device 50 and the HCU 100 via the communication bus 99. The locator ECU 44 may be configured to determine whether the requested high-precision map data is stored in the high-precision map DB 43 in response to a request from the HCU 100. When the requested high-precision map data is stored in the high-precision map DB 43, the locator ECU 44 reads the corresponding high-precision map data from the high-precision map DB 43 and provides it to the request source of the HCU 100.

The navigation device 50 is an in-vehicle device that cooperates with the HMI system 10 to provide route guidance to a destination set by an occupant. The navigation device 50, together with the HCU 100, configures a display system 110 of the vehicle A. The navigation device 50 includes a map database for navigation (hereinafter referred to as a navigation map DB) 51, a navigation display 52, and a navigation ECU 53.

The navigation map DB 51 includes a non-volatile memory, and comprehensively stores map data having a wider range than that of the high-precision map DB 43. The navigation map data stored in the navigation map DB 51 includes link data, node data, shape data, which are related to the roads.

The navigation display 52 is provided by a display device, such as a liquid crystal display, an organic EL display or the like. The navigation display 52 is positioned, for example, at a center portion of an upper surface of an instrument panel 9, or on a center cluster. On a screen of the navigation display 52, an image for route guidance (hereinafter referred to as a route guidance image) is displayed. The route guidance image includes a map image element provided based on the navigation map data, a route image element indicating a route to the destination and via points along the route, and spot image elements indicating the destination and spots along the route.

The navigation ECU 53 includes a microcomputer, which is also known as a microcontroller. The microcomputer includes a processor, a RAM, a storage unit, an input and output interface, a bus connecting these components. The navigation ECU 53 acquires position information and direction information of the vehicle A, that is, own vehicle from the locator ECU 44 via the communication bus 99.

The navigation ECU 53 acquires the operation information input to the operation device 26 through the communication bus 99 and the HCU 100, and sets the destination based on the user operation. The navigation ECU 53 searches for multiple routes to the destination so as to satisfy conditions such as time priority and distance priority. When one of the searched routes is selected, the navigation ECU 53 provides the route information related to the set route to the HCU 100 through the communication bus 99 together with the related navigation map data.

The navigation ECU 53 outputs a guidance execution request to the HMI system 10 when the vehicle approaches toward a branch point such as an intersection, a destination of set route, and an alert point such as a stop point. In the HMI system 10, the HUD device 20 performs route guidance to the driver in response to the guidance execution request. In the following description, the points along the set route where the route guidance to the driver is performed are referred to as route guidance points.

The navigation ECU 53 calculates the route to the destination, and generates route guidance information to the destination. In the route guidance to the destination, the navigation ECU 53 specifies an inter-point distance from the first route guidance point existing in the immediate vicinity of the own vehicle to the second route guidance point following the first route guidance point. When the inter-point distance is equal to or shorter than a predetermined distance the navigation ECU 53 determines that multiple route guidance points are successive points that require successive guidance. The predetermined distance between two successive points may have a threshold value of, for example, about 150 to several hundred meters. In this case, the navigation ECU 53 includes, in the route guidance information, a notification (flag) indicating that the route guidance performed by the navigation display 52 is the successive guidance which successively or continuously guide multiple route guidance points, and provides the route guidance information to the HCU 100.

Figure 5:
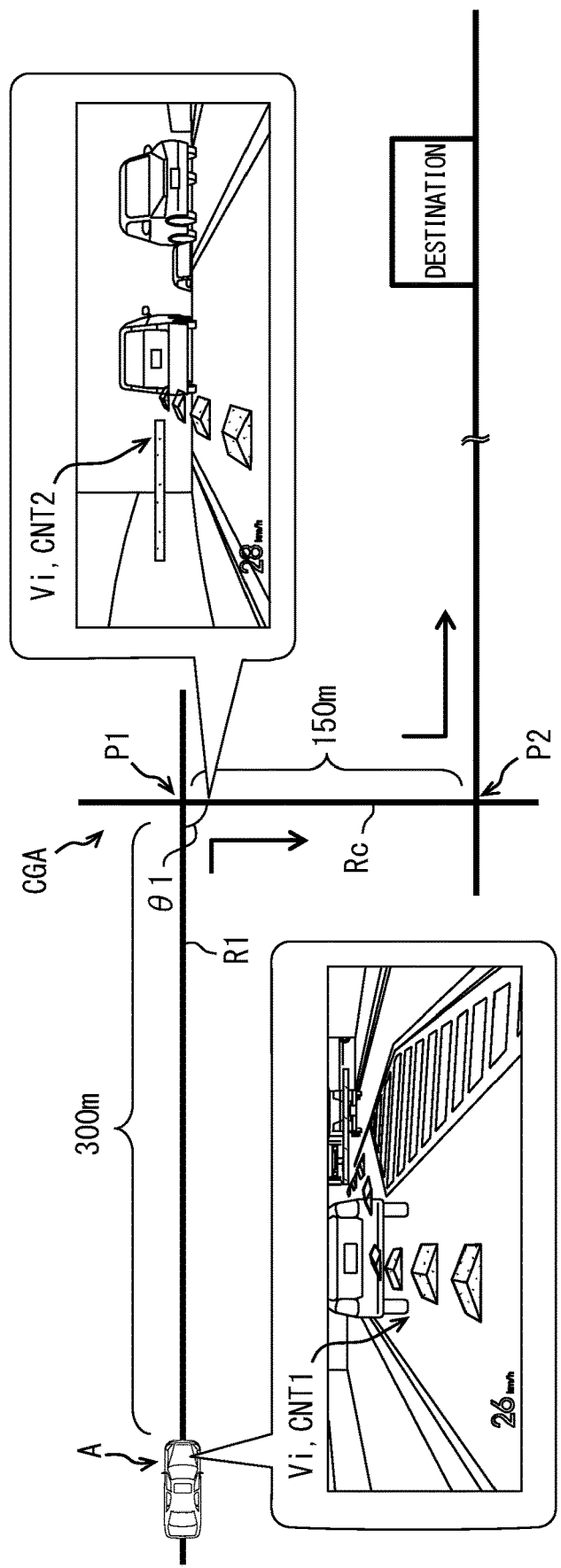
FIG. 5 is a diagram showing an example which successively guides turning points.

When the navigation ECU 53 determines that the latest route guidance is the successive guidance, the navigation ECU 53 starts to display the first time route guidance (also referred to as a first route guidance) and the second time route guidance (also referred to as a second route guidance). The display of the second route guidance may be started substantially at the same time as the display of the first route guidance, or may be started slightly later than the display of the first route guidance. For example, the display of first route guidance may be continued until the display of second route guidance is deactivated. For another example, the display of first route guidance may be deactivated before the display of second route guidance is deactivated. In the navigation device 50, an area in which both of the first route guidance and the second route guidance are started is referred to as a successive guidance area CGA as shown in FIG. 5. The successive guidance area CGA includes at least two route guidance points and a connection road Rc connecting the two route guidance points as shown in FIG. 5.

The vehicle control ECU 54 is an electronic control device that performs acceleration and deceleration control and steering control of the vehicle A. The vehicle control ECU 54 is connected to a group of sensors that detect driving operation made by the driver. For example, the sensors include a steering angle sensor 55, an accelerator position sensor, and a brake stroke sensor. The vehicle control ECU 54 is connected to a group of actuators related to a traveling of the vehicle A. For example, the actuators include an electric power steering (EPS) motor, an electronic control throttle and injector, and a brake actuator.

The vehicle control ECU 54 outputs measurement information, such as steering angle information measured by the sensor group to the communication bus 99, and acquires the driving operation information described later from the driving support ECU 57 through the communication bus 99. The vehicle control ECU 54 controls each operation of the actuator group to eventually control a behavior of the vehicle A based on the measurement information measured by the sensor group or based on the driving operation information acquired from the driving support ECU 57.

The driving support ECU 57 includes at least one of a driving support function that assists the driver's driving operation or an automatic driving function that can substitute the driver's driving operation. The driving support function or the automatic driving function includes an adaptive cruise control (ACC) function that controls a traveling speed or an inter-vehicle distance and an lane tracing control (LTC) function that controls a steering angle to keep the vehicle within the travelling lane. The driving support function may further include an autonomous emergency braking (AEB) function for forcibly decelerating the vehicle A.

The driving support ECU 57 recognizes the traveling environment around the vehicle A based on the detection information acquired from the peripheral monitoring sensor 30. The driving support ECU 57 generates driving operation information for driving support or for automatic driving based on the recognition result of the driving environment. The driving support ECU 57 controls the vehicle control ECU 54 to execute the above-described acceleration deceleration control and steering control by providing the generated driving operation information to the vehicle control ECU 54.

The driving support ECU 57 is configured to provide the HCU 100 with the analysis result of the detection information as analyzed detection information. The analysis of the detection information is carried out for recognizing the driving environment of the vehicle. As an example, the driving support ECU 57 can provide the HCU 100 with information extracted from the image data captured by the front camera 31. Specifically, the extracted information may include lane markings (for example, white lines) of the traveling road and the relative position information to the road edges. The driving support ECU 57 can also provide the HCU 100 with type information and three-dimensional shape information of structures positioned in the roadside area. The roadside area includes side areas of the road.

The following will describe details of the operation device 26, the DSM 27, the HUD device 20, and the HCU 100, which are included in the HMI system 10.

The operation device 26 is an input portion that accepts an operation of user, such as a driver or the like. The operation device 26 receives the user operation for switching, for example, the driving support function and the automatic driving function between an activated state and a deactivated state. Specifically, the operation device 26 includes a steering switch provided on a spoke portion of the steering wheel, an operation lever provided on a steering column portion 8, and a voice input device for detecting the driver's voice or speech.

The DSM 27 includes a near-infrared light source, a near-infrared camera, and a control unit for controlling the near-infrared light source and the near-infrared camera. The DSM 27 is installed to have a posture in which the near-infrared camera is directed toward a headrest portion of the driver's seat. For example, the DSM 27 may be installed on an upper surface of the steering column portion 8 or an upper surface of the instrument panel 9. The DSM 27 captures, using the near infrared camera, images of the driver's which is irradiated by near infrared light emitted from the near infrared light source. The images captured by the near infrared camera are analyzed by the control unit. The control unit extracts information such as the position of the eye point EP and the line-of-sight direction from the captured image, and successively outputs the extracted state information to the HCU 100.

The HUD device 20 is mounted on the vehicle A as one of in-vehicle display devices together with a multi-information display and the navigation display 52. The HUD device 20 provides various information related to the vehicle A to the driver by augmented reality (hereinafter referred to as AR) display using a virtual image Vi. The HUD device 20 properly uses a normal virtual image Vi (hereinafter referred to as non-AR content) and a virtual image Vi displayed in AR (hereinafter referred to as AR content) for different purposes to provide information to the driver.

The non-AR content is displayed in a manner that the content is relatively fixed to the vehicle configuration such as the front windshield WS. The AR content is displayed in an overlapped manner on a specific target Tr, and is configured to move together with the target Tr so as to be relatively fixed to the target Tr when viewed from the driver. Hereinafter, the specific target on which the AR content is overlapped is also referred to as a superimposition target. The AR content has, for example, a shape extending in a depth direction viewed from the driver, and the shape is continuously updated at a predetermined cycle according to a relative position and a shape of the superimposition target.

The HUD device 20 is electrically connected to the HCU 100 and successively acquires video data generated by the HCU 100. The HUD device 20 is disposed in a housing space inside the instrument panel 9 below the windshield WS. The HUD device 20 projects light formed as the virtual image Vi toward a projection range PA of the windshield WS. The light projected toward the windshield WS is reflected toward the driver's seat in the projection area PA and is perceived by the driver. The driver visually recognizes the display image in which the virtual image Vi is superimposed on the superimposition target in the front view which is viewed through the projection range PA.

The HUD device 20 includes a projector 21 and a magnifying optical system 22. The projector 21 includes a liquid crystal display (LCD) panel and a backlight. The projector 21 is fixed to a housing of the HUD device 20 to have a posture in which a display surface of the LCD panel faces the magnifying optical system 22. The projector 21 displays each frame image of the video data on the display surface of the LCD panel, and illuminates the display surface with the backlight that transmits the display surface. Thus, the light formed as a virtual image Vi is emitted toward the magnifying optical system 22. The magnifying optical system 22 includes at least one concave mirror in which metal such as aluminum is vapor-deposited on a surface of base material made of, such as synthetic resin or glass. The magnifying optical system 22 projects the light emitted from the projector 21 on an upper projection range PA while spreading the light by reflection.

In the HUD device 20, an angle of view VA is set. When a virtual range in the space where the virtual image Vi can be imaged by the HUD device 20 is defined as an imaging plane IS, the angle of view VA is defined as an angle defined based on a virtual line connecting the driver's eye point EP and an outer edge of the image plane IS. The angle of view VA is a range of angle within which the driver can visually recognize the virtual image Vi when viewed from the eye point EP. In the HUD device 20, a horizontal angle of view (for example, about 10 degrees to 12 degrees) in the horizontal direction is larger than a vertical angle of view (for example, about 4 degrees to 5 degrees) in the vertical direction. When viewed from the eye point EP, a front range that overlaps with the image plane IS is the range of the angle of view VA.

In the HMI system 10, the HCU 100 is an electronic control device that integrally controls a display performed by multiple in-vehicle display devices including the HUD device 20. The HCU 100 includes a computer, and the computer includes a processor 11, a RAM 12, a storage unit 13, an input and output interface 14, and a bus connecting these components. The processor 11 is a hardware combined with the RAM 12, and executes arithmetic processing. The processor 11 includes at least one calculation core, such as a central processing unit (CPU) or a graphics processing unit (GPU). The processor 11 may further include a field-programmable gate array (FPGA) and an IP core having other dedicated functions. The RAM 12 may include a video RAM for generating video. The processor 11 accesses the RAM 12 to execute various processes for providing the functions of the respective functional blocks. The storage unit 13 includes a non-volatile storage medium. The storage unit 13 stores various programs (display control programs, etc.) to be executed by the processor 11. The storage unit 13 is also referred to as a non-transitory storage medium.

Figure 3:
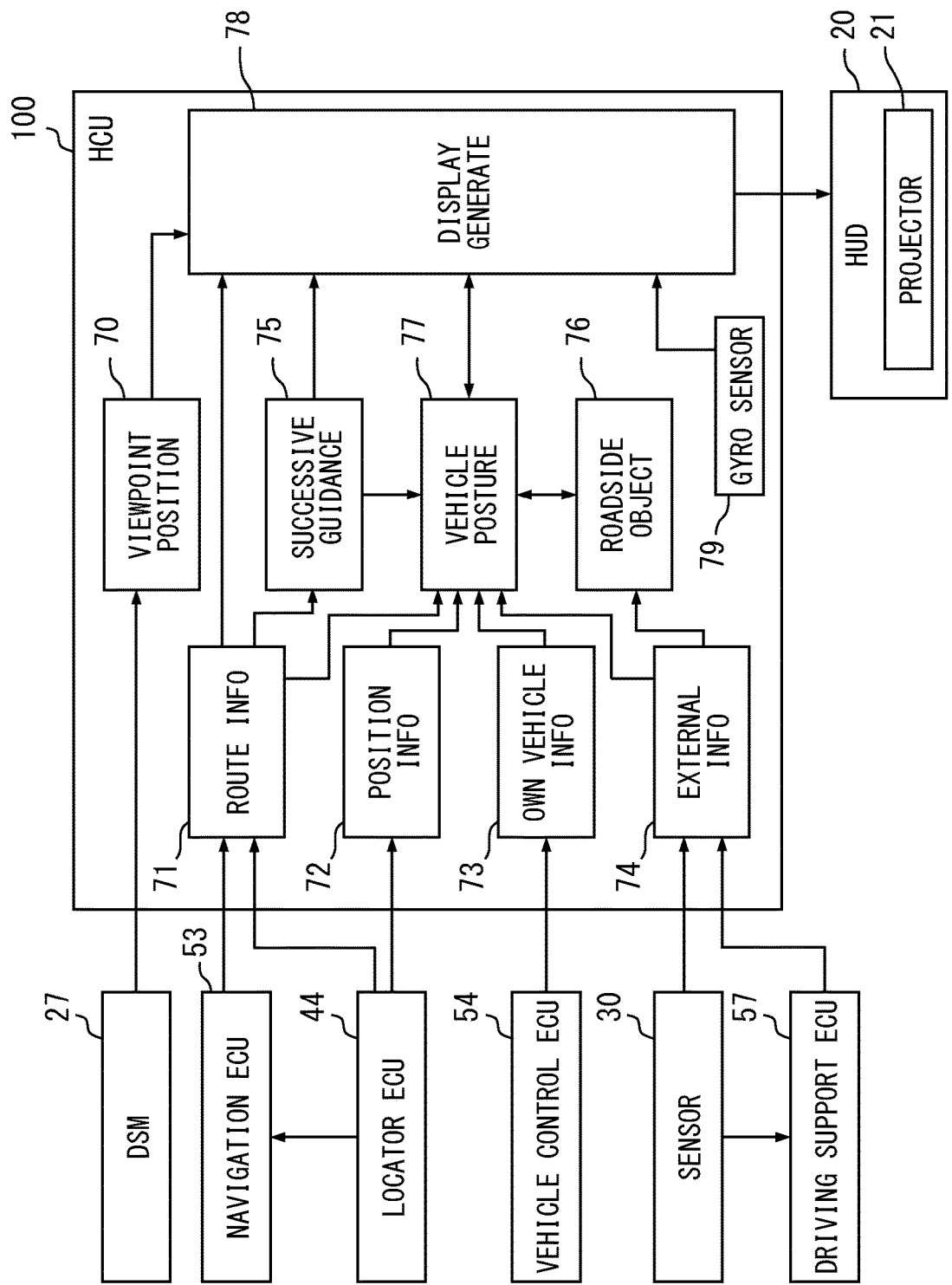
FIG. 3 is a diagram showing an example of a configuration of an HCU.

The HCU 100 shown in FIG. 1 to FIG. 3 includes multiple functional blocks provided by execution of the programs stored in the storage unit 13 by the processor 11. Specifically, the HCU 100 includes, as functional blocks, a viewpoint position specifying unit 70, a route information acquisition unit 71, a position information acquisition unit 72, an own vehicle information acquisition unit 73, an external information acquisition unit 74, a successive guidance determination unit 75, a roadside object determination unit 76, a vehicle posture estimation unit 77, and a display generation unit 78. The viewpoint position specifying unit 70, the route information acquisition unit 71, the position information acquisition unit 72, the own vehicle information acquisition unit 73, and the external information acquisition unit 74 acquire the information from the communication bus 99.

The viewpoint position specifying unit 70 identifies a position of the eye point EP of the driver seated on the driver seat based on the state information acquired from the DSM 27. The viewpoint position specifying unit 70 generates three-dimensional coordinates (hereinafter referred to as eye point coordinates) indicating the position of eye point EP, and provides the generated eye point coordinates to the display generation unit 78.

When the destination is set in the navigation device 50, the route information acquisition unit 71 acquires the route guidance information related to the route guidance and the navigation map data used for the route guidance from the navigation ECU 53. The route information acquisition unit 71 acquires the guidance execution request output from the navigation ECU 53 together with the route guidance information and the navigation map data when the vehicle A approaches toward the guidance point. When the navigation device 50 executes the successive guidance, the route information acquisition unit 71 acquires the route guidance information that includes a notification notifying existence of successive guidance (hereinafter referred to as successive guidance notification).

The route information acquisition unit 71 is configured to perform a process of acquiring high-precision map data from the locator 40 together with the navigation map data or instead of the navigation map data. The route information acquisition unit 71 requests the locator ECU 44 to provide related high-precision map data based on the route information acquired from the navigation ECU 53. When the high-precision map data requested by the route information acquisition unit is stored in the high-precision map DB 43, the route information acquisition unit 71 acquires the high-precision map data transmitted from the locator ECU 44.

The position information acquisition unit 72 acquires the position information and direction information of the vehicle A from the locator ECU 44. The own vehicle information acquisition unit 73 acquires the latest steering angle information measured by the steering angle sensor 55 from the vehicle control ECU 54 as one of the own vehicle information indicating the traveling state of the vehicle A. The own vehicle information acquisition unit 73 further acquires posture information of the vehicle, particularly the posture information related to the vehicle posture in the pitch direction of the vehicle. Specifically, the own vehicle information acquisition unit 73 acquires, as the posture information, height information based on an output of a height sensor and torque information indicating braking torque and driving torque generated by the vehicle A.

The external information acquisition unit 74 acquires detection information about the front range of the vehicle A from at least one of the peripheral monitoring sensor 30 or the driving support ECU 57. The detection information may be image data of the front range taken by the front camera 31, or may be an analysis result obtained by recognizing the vehicle's driving environment by the peripheral monitoring sensor 30 or by the driving support ECU 57.

Figure 9:
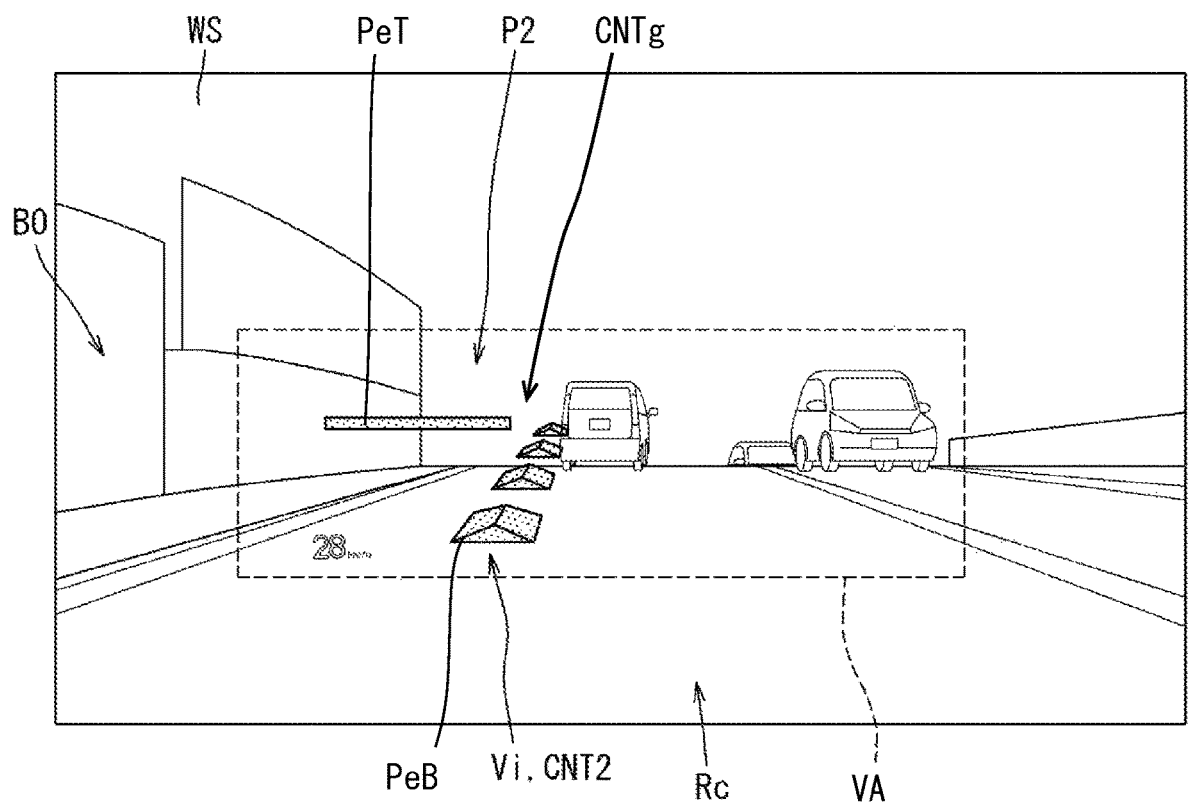
FIG. 9 is a diagram showing an example of a second guidance content that guides a successive point.

In a case where the detection information is the analysis result, the analysis result includes information indicating the relative position of the lane marking or the road edge in the front range as described above. In the case where the detection information is the analysis result, the analysis result includes at least one of the type information or three-dimensional shape information about the structure positioned on the roadside in the front range of the vehicle, for example, a shield BO that blocks the driver's side view as shown in FIG. 9. The shield BO is, for example, an architecture, such as a building, or a blocking wall surrounding a site positioned along the roadside area.

The successive guidance determination unit 75 determines whether to execute the successive guidance. For example, the successive guidance is executed in a case where a guidance point for guiding the vehicle A (own vehicle) to make a right or left turn (hereinafter, the guidance point is also referred to as a turning point P1 as shown in FIG. 5) exists and a successive guidance point for guiding the vehicle A to make a right or left turn after the turning point P1 (hereinafter, the successive guidance point is also referred to as a successive point P2 as shown in FIG. 5) exists. The successive guidance determination unit 75 determines whether the route guidance information acquired by the route information acquisition unit 71 includes successive guidance notification indicating the existence of multiple successive guidance points. When the route guidance information includes the successive guidance notification, the successive guidance determination unit 75 notifies the display generation unit 78 of the execution of the successive guidance.

When the successive guidance determination unit 75 obtains the successive guidance notification, the successive guidance determination unit 75 obtains the distance between two adjacent guidance points. The successive guidance determination unit 75 determines whether the distance between two adjacent points is shorter than a predetermined distance (for example, about 100 meters). The predetermined distance is defined so that the time required for obtaining the content of the route guidance to be executed at the successive point P2 is secured. When the distance between the two points is shorter than the predetermined distance, the successive guidance determination unit 75 notifies the display generation unit 78 of the determination result that the two guidance points are very close to each other.

The turning point P1 may be limited to a guidance point where a branch such as a right turn or a left turn can be made, such as an intersection. The successive point P2 may be any one of a branch point such as an intersection, a destination of a set route, and an alert point for calling the driver's attention such as a stop or a slowdown.

For example, three or more guidance points may be successively positioned on the set route at intervals less than the threshold distance from one another. In this case, the intermediate successive point P2 positioned between the first turning point P1 and the last successive point P2 is limited to a branch point such as an intersection similar to the turning point P1. For example, when multiple branches (for example, four branches) exist successively along the route, the group of route guidance information includes information on the multiple guidance points (four guidance points). The successive guidance determination unit 75 sets, as the first guidance point, the turning point P1, and sets, as the second to fourth guidance points, the successive points P2 for convenience.

The roadside object determination unit 76 determines whether a specific object exists in the roadside area of the road on which the vehicle A travels, based on the detection information acquired by the external information acquisition unit 74. The specific object is an object for which a condition is set in advance as the object is not appropriate as the superimposition target on which the route guidance content CNTg (as shown in FIG. 9) that guides the successive point P2 is superimposed. Specifically, the roadside object determination unit 76 specifies the above-described shield BO (as shown in FIG. 9) positioned in the roadside area as the specific object. The roadside object determination unit 76 determines whether a shield BO exists in a roadside area of a road segment (hereinafter referred to as connection road Rc as shown in FIG. 5) between the turning point P1 (branch point) where the vehicle A makes a right or left turn and the successive point P2 toward which the vehicle A moves after make a turning at the turning point P1. In a case where no shield BO exists in the roadside area of the connection road Rc, that is, in a case where the roadside area is not blocked, the roadside object determination unit 76 provides the display generation unit 78 with a determination result indicating no shield BO exists.

The vehicle posture estimation unit 77 estimates a direction of the vehicle A which makes a right or left turn at the turning point P1 relative to the connection road Rc as the traveling direction of the vehicle A. The vehicle posture estimation unit 77 is configured to estimate the traveling direction of the vehicle A based on multiple determination methods using multiple and various acquired information different from one other. The vehicle posture estimation unit 77 successively outputs the estimation result of the traveling direction of the vehicle A to the display generation unit 78 at least during a period before and during a period after passing the turning point P1.

As the first determination method, the vehicle posture estimation unit 77 estimates the traveling direction of the vehicle A based on the detection information of the front camera 31 acquired by the external information acquisition unit 74. This detection information may be the image data captured by the front camera 31, or may be the analysis result of the image data as described above. Based on the detection information, the vehicle posture estimation unit 77 specifies the relative positions of the lane markings or the road edges of the connection road Rc, and estimates the traveling direction of the vehicle A with reference to extending directions of the detected lane markings or the road edges.

As the second determination method, the vehicle posture estimation unit 77 determines the travelling direction of the vehicle A using the map data acquired by the route information acquisition unit 71 and the direction information acquired by the position information acquisition unit 72. The map data may be either high-precision map data or navigation map data. In a case where both of the lane markings and the road edges of the connection road Rc cannot detected from the image data captured by the front camera, the vehicle posture estimation unit 77 determines the traveling direction of the vehicle by combining the map data and the direction information.

Based on the map data, the vehicle posture estimation unit 77 calculates, as shown in FIG. 5, an intersection angle θ1 between the road (hereinafter referred to as a first road R1) heading to the turning point P1 and the connection road Rc at the turning point P1. The vehicle posture estimation unit 77 calculates, with the extending direction of the first road R1 as a reference, the posture change angle of the vehicle A in the yaw direction at the turning point P1 based on the direction information. The vehicle posture estimation unit 77 estimates the traveling direction of the vehicle A based on the intersection angle θ1 and the posture change angle of the vehicle A.

As the third determination method, the vehicle posture estimation unit 77 determines the traveling direction of the vehicle A using the steering angle information acquired by the own vehicle information acquisition unit 73. The vehicle posture estimation unit 77 estimates that the vehicle A is facing in the direction of the connection road Rc based on the decrease in the steering angle. In a case where it is difficult to detect the lane marking and the road edge of the connection road Rc and a reception environment of the positioning signal is in bad state, the vehicle posture estimation unit 77 determines the traveling direction using the steering angle information.

The display generation unit 78 generates video data which is to be successively output to the HUD device 20. The display generation unit 78 has a function of selecting content, a function of drawing the selected content, a function of controlling a display period of the selected content, and the like. The following will describe details of the content selection function and the content drawing function with reference to FIG. 4 together with FIG. 1 to FIG. 3.

The display generation unit 78 selects the content to be displayed by the HUD device 20 based on the external information, such as the guidance execution request (S11). The display generation unit 78 can individually select AR content and non-AR content to be displayed. When displaying both of AR content and the non-AR content using virtual images, the display generation unit 78 performs, in parallel manner, the drawing processing of the original image for the AR content (S21 to S24) and drawing processing of the original image for the non-AR content (S31). The display generation unit 78 prepares the original image of each selected content by image processing such as combining the component data stored in the storage unit 13.

The display generation unit 78 builds a 3D model for drawing the original image of the AR content (S21). In the building of 3D model, the position information and the shape information of the superimposition target (for example, the road surface) acquired by the external information acquisition unit 74 are used. The display generation unit 78 arranges the generated 3D model in the virtual space with reference to the position of the own vehicle (S22). In the arrangement of the 3D model, information indicating the traveling direction of the vehicle A estimated by the vehicle posture estimation unit 77 is used.

The display generation unit 78 sets, virtually, the position of the camera and the position of the magnifying optical system 22 (or the image plane IS) in the virtual space in which the 3D model is arranged. The display generation unit 78 calculates the shape of the 3D model viewed from the virtual camera position using a viewpoint conversion process (S23). The virtual camera position in the virtual space corresponds to the position of the driver's eye point EP. The virtual camera position is corrected based on the eye point coordinates acquired by the viewpoint position specifying unit 70. The virtual camera position and the optical system position are corrected to positions that reflect the posture change of the vehicle A based on the height information and the torque information acquired by the own vehicle information acquisition unit 73. As described above, in the viewpoint conversion process, each correction is mainly performed in a low frequency band (for example, lower than 0.5 Hz) in response to the change in the posture of the vehicle A and the change in the eye point EP of the driver. Then, the display generation unit 78 draws the original image of the AR content (S24)

The display generation unit 78 draws the original image of the selected non-AR content (S31) in parallel with the drawing of the original image of the AR content. The display generation unit 78 synthesizes the original images of the AR content and the non-AR content drawn in parallel to generate an output image (S41).

The display generation unit 78 acquires the latest measurement result from the gyro sensor 79 included in the HCU 100. The gyro sensor 79 is a measuring unit that measures high frequency band posture change (for example, a change occurring within a frequency range of 0.5 to 2 Hz) among the whole posture changes that occur to the vehicle A. As an example, the gyro sensor 79 measures the angular velocity in each of the pitch direction and the roll direction of the vehicle A, and successively outputs the measurement results to the display generation unit 78.

In the output image generation process, the display generation unit 78 refers to the measurement information of the gyro sensor 79 and adjusts the position of the original image of the AR content in the output image so as to reflect the posture change in the high frequency band. The display generation unit 78 applies a predetermined deformation to the output image so that the distortion of the light image due to the reflection by the magnifying optical system 22 is canceled out. The output image to which the distortion correction is applied becomes an individual frame image of the video data. The display generation unit 78 successively outputs the video data including a large number of output images to the projector 21 (S42).

The following will describe details of the function of controlling the display period of the selected content with reference to FIG. 1 to FIG. 3 based on the successive guidance example shown in FIG. 5 to FIG. 9.

The display generation unit 78 generates, using the route guidance information acquired from the navigation ECU 53, the route guidance content CNTg, and the HUD device 20 displays the route guidance content CNTg in the superimposed manner on the road surface in the front view. The route guidance information includes position information of each guidance point, distance information between two adjacent guidance points, the turning direction at each intersection, navigation map data, and the like. The navigation map data includes the type of road on which the vehicle is traveling, the shape of the intersection, the number of lanes at the intersection, the defined travelling direction allowed for each lane, and the like.

The display generation unit 78 starts the route guidance at the guidance point using the route guidance content CNTg generated based on the route guidance information, in response to the guidance execution request notified from the navigation ECU 53 as a trigger. In the successive guidance case, the display generation unit 78 starts display of the first route guidance content CNTg in response to the acquisition of the guidance execution request, and sets the display start time and the display end time of each route guidance content CNTg, respectively.

The display generation unit 78 refers to the navigation map data or the high-precision map data acquired by the route information acquisition unit 71, and determines the type of the road on which the vehicle is traveling. The display generation unit 78 changes the display method of the route guidance content CNTg displayed in the successive guidance according to whether the traveling road is an expressway such as a motorway or a national expressway.

When the display generation unit 78 determines that the traveling road is an expressway, the display generation unit 78 performs the same route guidance as the navigation device 50 in response to the successive guidance notification. That is, when the vehicle arrives at a point prior to the first guidance point where the first route guidance is to be executed by a predetermined distance (for example, 1 km), the display generation unit 78 concurrently displays the route guidance content CNTg prepared for the first route guidance together with the route guidance content CNTg prepared for the second route guidance.

When the display generation unit 78 determines that the traveling road is not an expressway, the display generation unit 78 successively starts display of the multiple route guidance contents CNTg in response to the successive guidance notification. Specifically, in the successive guidance area CGA where the route guidance for making a right or left turn successively continues, the display generation unit 78 displays the route guidance content CNTg (hereinafter referred to as first guidance content CNT1) prepared for the first route guidance in response to the successive guidance notification. At this time, the display of the route guidance content CNTg (hereinafter referred to as second guidance content CNT2) prepared for the second route guidance is not started. The display generation unit 78 deactivates the display of first guidance content CNT1, and then activates display of the second guidance content CNT2. In the successive guidance area CGA, the navigation device 50 displays the route guidance image for performing the first route guidance concurrently together with the route guidance image for performing the second route guidance The display generation unit 78 starts a drawing process of the prepared drawing data on each frame image prior to each guidance point so that the drawing process matches the traveling of the vehicle A along the set route, and starts display of the route guidance content CNTg. The display generation unit 78 ends the drawing process for drawing data on each frame image at a predetermined position set related to each guidance point, and ends the display of the route guidance content CNTg. The following will describe details of the display start time and the display end time of the first guidance content CNT1 and the second guidance content CNT2 within the successive guidance area CGA shown in FIG. 5.

(Display Start Time of First Guidance Content)

The navigation ECU 53 outputs the route guidance information including the successive guidance notification to the HCU 100 together with the guidance execution request at a position prior to the first intersection (turning point P1) by a predetermined distance (for example, 300 meters). The display generation unit 78 starts the display of first guidance content CNT1 as the route guidance content CNTg using the route guidance information in response to the acquisition of the guidance execution request by the route information acquisition unit 71.

Figure 7:
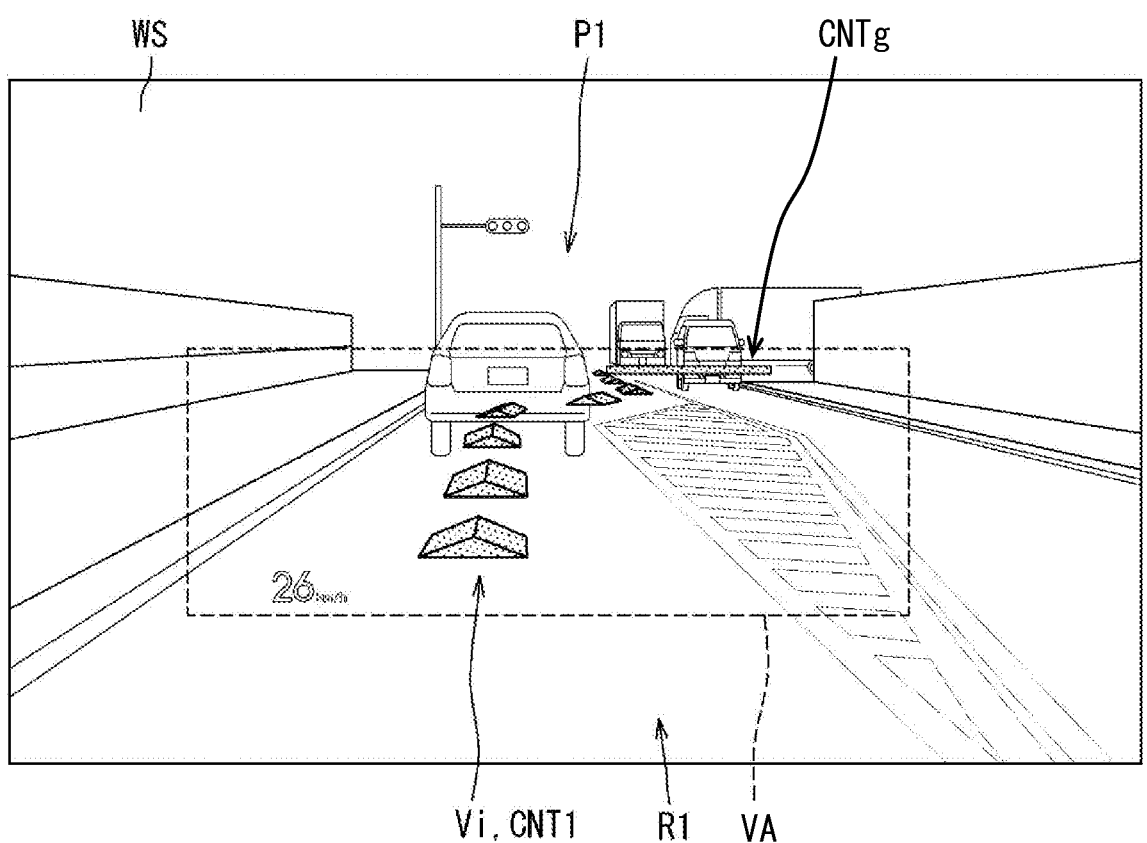
FIG. 7 is a diagram showing an example of a first guidance content that guides a turning point.

The first guidance content CNT1 is a right turn content that instructs a right turn at the turning point P1 as shown in FIG. 7. The first guidance content CNT1 is superimposed and displayed on the road surface of the first road R1, and displays, to the driver, the set travelling route of the vehicle A based on the route guidance information. The first guidance content CNT1 displays the approach route toward the turning point P1 and the exit route from the turning point P1 using AR. With such a display, the first guidance content CNT1 instructs the driver to move to the right turn lane before arriving at the turning point P1, and then to make a right turn at the turning point P1.

(Display End Time of First Guidance Content)

Figure 6:
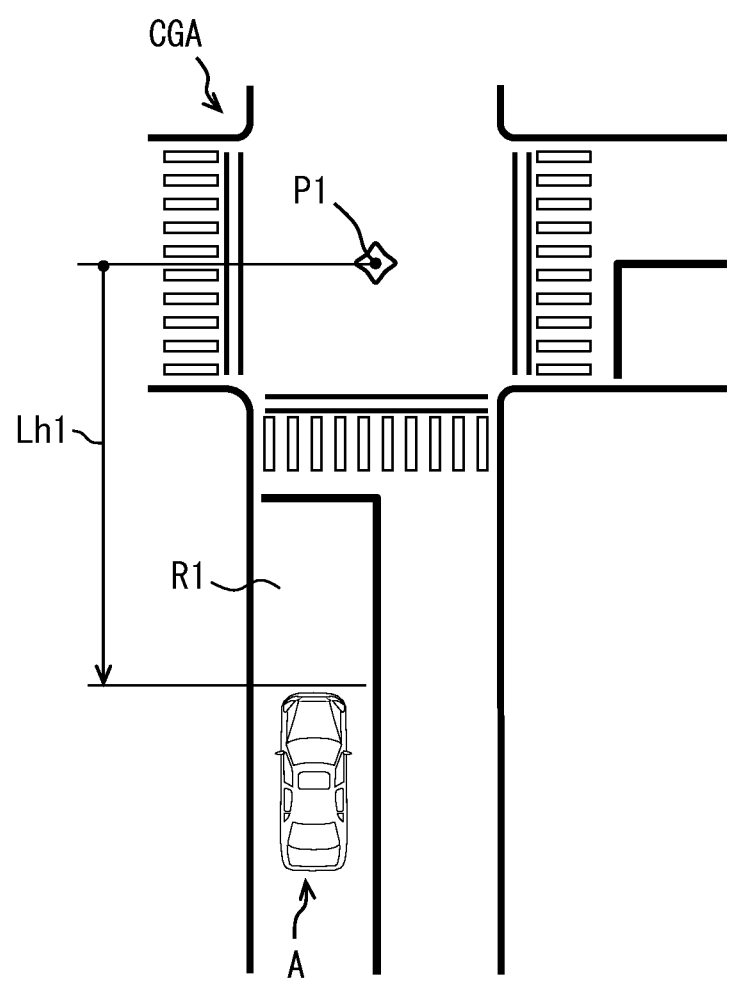
FIG. 6 is a diagram showing an example of a display end time of a first guidance content.

The display generation unit 78 deactivates the display of first guidance content CNT1 before the vehicle A reaches the turning point P1. Specifically, the display generation unit 78 obtains the distance from the own vehicle to the turning point P1 based on the map data acquired by the route information acquisition unit 71 and the position information of the vehicle A (own vehicle) acquired by the position information acquisition unit 72. As shown in FIG. 6, when the distance from the own vehicle to the turning point P1 is shorter than a predetermined distance (hereinafter referred to as end distance Lh1), the display generation unit 78 ends the display of the first guidance content CNT1. The end distance Lh1 may be set to, for example, about 15 meters. As an example, the end distance Lh1 is set to a distance at which the intersection including the turning point P1 is framed out below the angle of view VA. In the present embodiment, an interval for no display of the route guidance content CNTg is provided between the display end time of the first guidance content CNT1 and the display start time of the second guidance content CNT2.

(Display Start Time of Second Guidance Content)

When the right turn of the vehicle A is started at the turning point P1, the display generation unit 78 acquires the determination result of the traveling direction from the vehicle posture estimation unit 77. The display generation unit 78 controls display start of the second guidance content CNT2 that provides route guidance for the successive point P2 based on the traveling direction of the vehicle A relative to the connection road Rc and the distance from the vehicle A (own vehicle) to the successive point P2. The display generation unit 78 starts display of the second guidance content CNT2 when the vehicle A arrives at a position prior to the successive point P2 by the predetermined distance and the traveling direction of the vehicle A approaches the extending direction of the connection road Rc.

Figure 8:
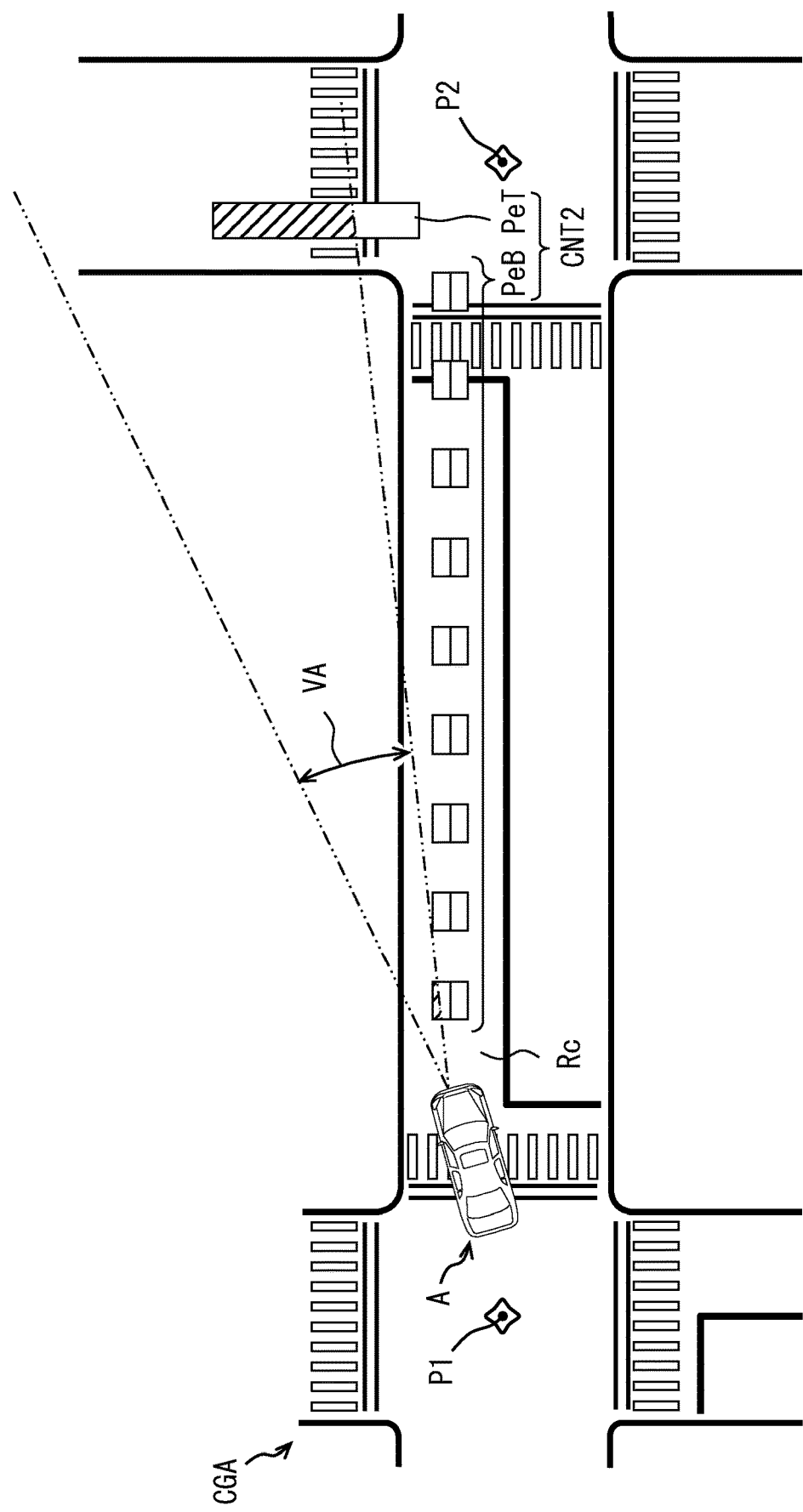
FIG. 8 is a diagram showing an example of a display start time of a second guidance content.

As shown in FIG. 8, the display generation unit 78 sets the display position of the second guidance content CNT2 to include the successive point P2 where the second route guidance is to be performed. The second guidance content CNT2 is a superimposed content including the base end image portion PeB and the tip end image portion PeT. In the second guidance content CNT2, the base end image portion PeB is a group of image elements superimposed on the road surface starting from the successive point P2 to the own vehicle, that is, the road surface of the connection road Rc. In the second guidance content CNT2, the tip end image portion PeT is an image element superimposed on the road surface starting from the successive point P2 toward the traveling direction of the set route. The overlapping range of the tip end image portion PeT is set to a length of, for example, several meters to 20 meter from the successive point P2 in the traveling direction of the set route.

Figure 4:
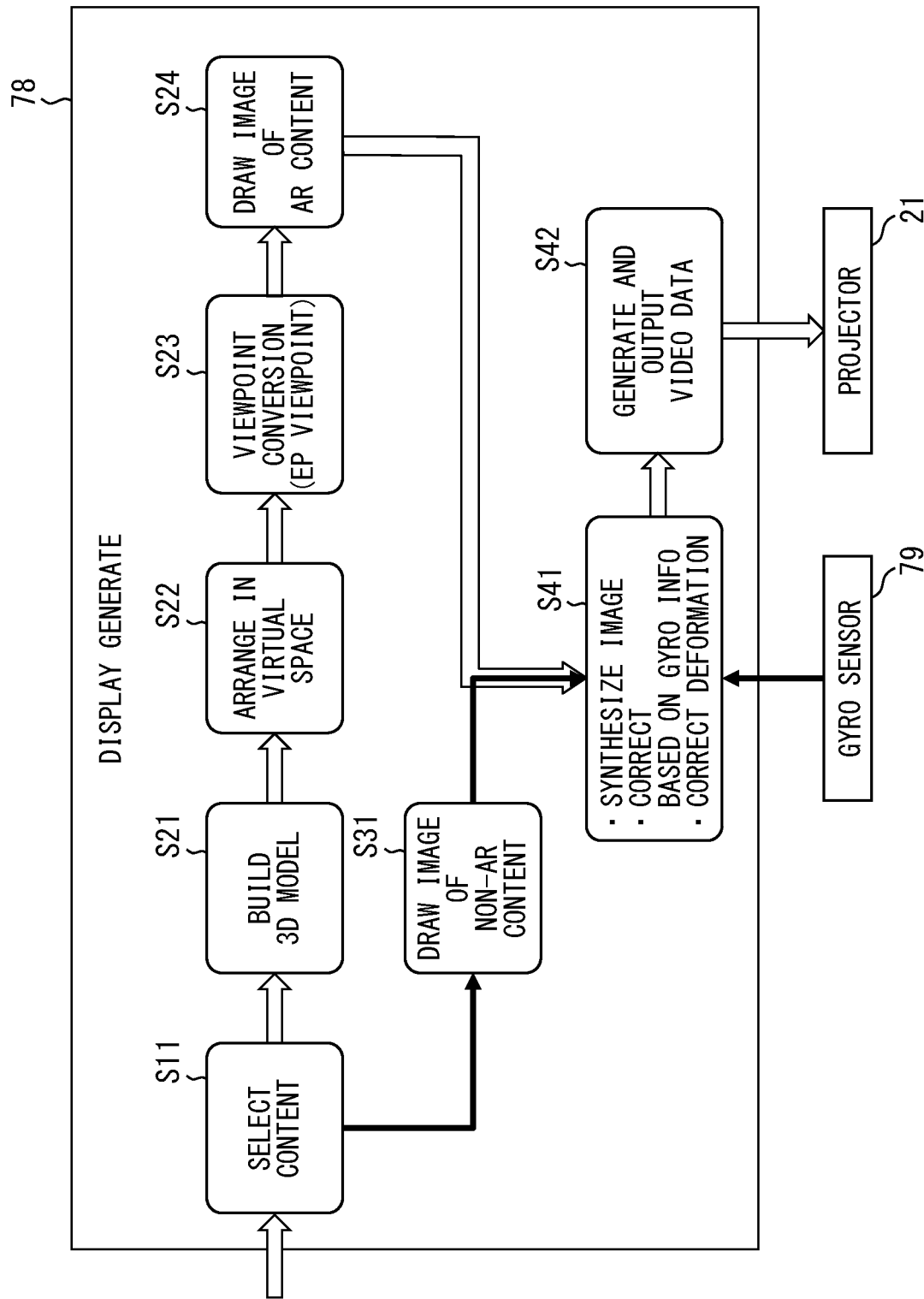
FIG. 4 is a diagram showing details of content drawing process executed by a display generation unit.

The display generation unit 78 obtains a positional relationship between the angle of view VA of the HUD device 20 and the 3D object corresponding to the second guidance content CNT2 based on the result of the layout simulation in the virtual space using the 3D object (S23 in FIG. 4). The display generation unit 78 starts the display of second guidance content CNT2 in response to a determination that at least a part of the base end image portion PeB is within the angle of view VA in the second guidance content CNT2 that is assumed to be superimposed on the set display position (see FIG. 8 diagonal line range).

As shown in FIG. 9, the second guidance content CNT2 is the route guidance content CNTg which is superimposed and displayed on the road surface of the connection road Rc, and displays, to the driver, the set travelling route of the vehicle A based on the route guidance information. The second guidance content CNT2 displays the approach route toward the successive point P2 and the exit route from the successive point P2 using AR. With such display, the second guidance content CNT2 indicates the relative position of the successive point P2, and instructs the driver to make a left turn at the successive point P2.

Further, the display generation unit 78 can adjust the display start time of the second guidance content CNT2 according to the inter-point distance between the turning point P1 and the successive point P2. As an example, when the successive guidance determination unit 75 determines that the inter-point distance is shorter than a predetermined distance (for example, about 100 meters), the display generation unit 78 adjusts the display start time of the second guidance content CNT2 to be earlier than a normal case.

For example, when the display of the second guidance content CNT2 is not started until the vehicle A becomes almost parallel relative to the extending direction of the connection road Rc, the display of second guidance content CNT2 is started immediately before the successive point P2 (for example, about 20 meters). In this case, it becomes difficult to secure the time required for understanding the content of the route guidance for the driver, and the successive point P2 may be outside the angle of view VA. Therefore, the route guidance may become meaningless.

When the distance between the turning point P1 and the successive point P2 is shorter than the predetermined distance, the display generation unit 78 eases the display start condition of the second guidance content CNT2. As an example, the display generation unit 78 starts the display of the second guidance content CNT2 immediately after the display of the first guidance content CNT1 is deactivated or at the time when the vehicle A has passed the turning point P1. At this time, the display generation unit 78 may display the second guidance content CNT2 as an icon-like shape in non-AR manner. The non-AR display of the second guidance content CNT2 as described above can make the driver to easily recognize the displayed content when the inter-point distance is not secured, for example, in a narrow street such as a residential area.

The display generation unit 78 changes the display start time of the second guidance content CNT2 according to a view toward the roadside area of the connection road Rc. When the roadside object determination unit 76 determines that no shield BO (see FIG. 12) exists in the roadside area of the connection road Rc, the display generation unit 78 sets the display start time of the second guidance content CNT2 earlier compared with a case where the roadside object determination unit 76 determines that a shield BO exists in the roadside area of the connection road Rc. As an example, the display generation unit 78 may start display of the second guidance content CNT2 based on the determination that at least a part of the second guidance content CNT2 which is to be superimposed on the set display position is within the angle of view VA.

The display generation unit 78 changes the display start time of the second guidance content CNT2 according to the type of the second guidance content CNT2, in other words, the type of the second guidance point. When the second guidance point is the destination, the display generation unit 78 displays the second guidance content CNT2 by superimposing the second guidance content CNT2 on a building or the like existing in the roadside area set as the goal point. In this case, the second guidance content CNT2 has a pin shape or the like which indicates the destination. The display generation unit 78 may start display of the second guidance content CNT2 based on a determination that at least a part of the second guidance content CNT2 is within the angle of view VA.

(Display End Time of Second Guidance Content)

The display generation unit 78 obtains the position information of the vehicle A (own vehicle), and ends the display of the second guidance content CNT2 based on the approach or pass-by of the successive point P2. As an example, the display generation unit 78 ends the display of the second guidance content CNT2 when the distance to the successive point P2 is less than a predetermined distance (for example, 15 meters), similar to the case of the first guidance content CNT1. As another example, the display generation unit 78 ends the display of the second guidance content CNT2 at the time when the vehicle A finishes passing-by of the successive point P2. Alternatively, the display generation unit 78 may end the display of the second guidance content CNT2 at a time when the vehicle A travels a predetermined distance after passing the successive point P2.

Figure 10:
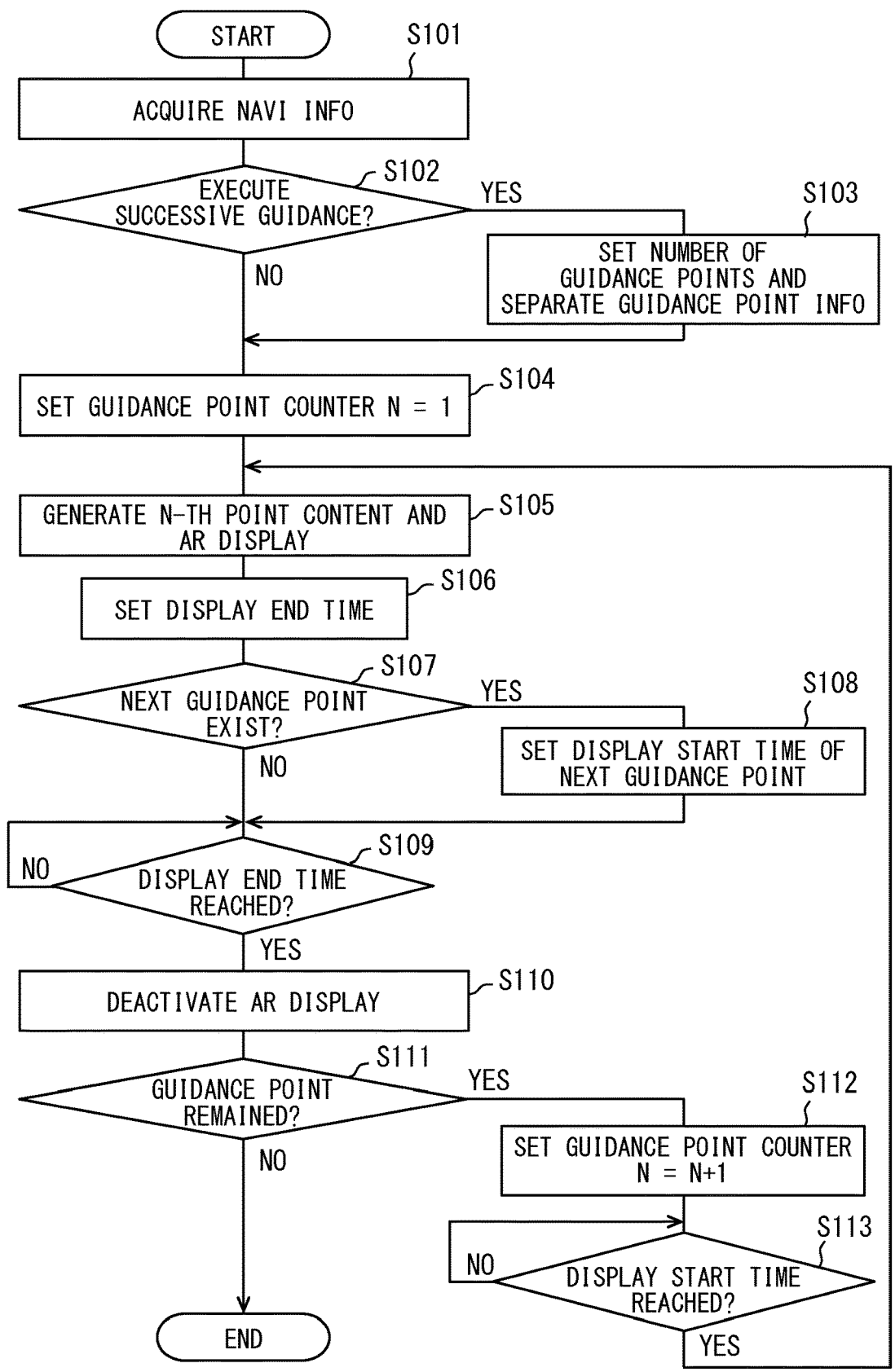
FIG. 10 is a flowchart showing a guidance display process executed by an HCU.

The following will describe details of the guidance display process executed by the HCU 100 with reference to FIG. 5 to FIG. 9 based on the flowchart shown in FIG. 10. The HCU 100 starts the guidance display process shown in FIG. 10 in response to the guidance execution request is notified from the navigation ECU 53 (see FIG. 1) to the HCU 100.

In S101, the HCU 100 acquires the navigation related information related to the guidance execution request that triggered the start of the guidance display process, specifically, the position information, the direction information, the route guidance information, and the like of the vehicle A, and proceeds to S102.

In S102, with reference to the route guidance information acquired in S101, the HCU 100 determines whether to execute successive guidance based on whether or not the route guidance information includes the successive guidance information. The process proceeds to S104 when the successive guidance is determined to be not executed in S102. The process proceeds to S103 when the successive guidance is determined to be executed in S102. In S103, the number of guidance points related to the successive guidance is specified based on the route guidance information. In S103, a series of route guidance information about the successive guidance area CGA is separated into multiple pieces of information so that each piece of information is related to individual guidance point, and then the process proceeds to S104.

In S104, a numerical value of the counter indicating counting result of the guidance points is set to "1", and the process proceeds to S105. In S105, the route guidance content CNTg for the current (Nth) guidance point is generated based on the numerical value of the counter. Specifically, by drawing the original image of the route guidance content CNTg on the video data, the AR display of the route guidance content CNTg is started, and the process proceeds to S106.

In S106, the display end time of the route guidance content CNTg being displayed is set, and the process proceeds to S107. In S107, the process determines whether the next (N+1th) guidance point exists. When the process determines in S107 that the next guidance point does not exist, the process proceeds to S109. When the process determine in S107 that the next (N+1th) guidance point (successive point P2, etc.) exists, the process proceeds to S108. In S108, the display start time of the route guidance content CNTg for the next guidance point is set, and the process proceeds to S109.

In S109, the process determines whether the display end time set in S106 is reached. When the process determines in S109 that the display end time is reached, the process proceeds to S110. In S110, the display of the current (Nth) route guidance content CNTg is deactivated, and the process proceeds to S111.

In S111, the process determines whether the preliminarily set guidance point in S103 is remained. When the process determines in S111 that there is no remaining guidance point, a series of guidance display processes based on the current guidance execution request is terminated. When the process determines in S111 that there remaining guidance point, the process proceeds to S112.

In S112, the value of the counter of the guidance point is increased by one, and the process proceeds to S113. In S113, the process determines whether the display start time set in S108 is reached. When the process determines in S113 that the display start time is reached, the process proceeds to S105. In the second and subsequent S105, the process generates, based on the value of the counter incremented in S112, the second guidance content CNT2 corresponding to the next (N+1th) guidance point, that is, the successive point P2, and displays the generated content in AR display manner. Then, in the subsequent S107 to S113, the end or start of the AR display is awaited. When the route guidance at all of the guidance points is completed in the above-described manner, a series of guidance display process based on the current guidance execution request is completed.

The following will describe operation and effects of the present embodiment.

In the successive guidance area CGA, the navigation device 50 executes successive guidance in which both of the first route guidance image is displayed and the second route guidance image is displayed on the navigation display 52. In such successive guidance, the HCU 100 may display the guidance content for guiding the first guidance point together with the guidance content for guiding the second guidance point when the route guidance information including information about multiple guidance points is acquired.

As described above, the angle of view VA of the HUD device 20 is limited in the left-right direction. Therefore, when the display of the guidance content of the second guidance point starts at the same time with the display of the guidance content of the first guidance point, the second guidance content may be cut off from the angle of view VA in some scenes. As a result, the second guidance content, which is displayed at an early stage, may make it difficult to be recognized by the user for the information displayed for the route guidance. Further, since the second guidance content is superimposed and displayed at a position far from the current position of the vehicle A, the display size is set to be small. The small size of the second guidance content may make it more difficult to be recognized by the user.

In the present embodiment, in order to solve such difficulty, in the successive guidance area CGA in which the navigation device 50 starts display of multiple route guidance images together, the HCU 100 successively displays the route guidance contents CNTg of respective guidance points. That is, the HCU 100 displays the first guidance content CNT1 that performs the first route guidance, deactivates the display of first guidance content CNT1, and then displays the second guidance content CNT2 that performs the second route guidance.

In the present embodiment, since the navigation device 50 starts the first route guidance and the second route guidance concurrently, the successive guidance by the HCU 100 can be notified to the user by the navigation device 50. The HCU 100 can provide information related to each guidance point in the route guidance. Specifically, until the display of first guidance content CNT1 related to the first guidance point is deactivated, the display of second guidance content CNT2 related to the second guidance point is in the standby state. As described above, by successively displaying the first guidance content CNT1 and the second guidance content CNT2, the display system 110 and the HCU 100 can display successive guidance in an overlapped manner to the user in an easy-understanding way.

As in the comparative example shown in FIG. 11, when the display of the content CNTX for the next guidance point (successive point) is started during a right or left turn at the current turning point, at least a part of the next display content CNTX may be overlapped on the shield BO positioned in the roadside area. For example, when switching to the content CNTX is performed based on the result of the map matching process performed by the navigation ECU 53, the superimposed display as in this comparative example is likely to occur. In this configuration, the content CNTX, which is started to be displayed in a state where the vehicle A is not facing the forward direction of the corresponding road, gives a misunderstanding or annoyance to the driver. Therefore, the information presented by the content CNTX is difficult to be correctly notified to the driver.

In the present embodiment, as shown in FIG. 9, the display of second guidance content CNT2 is started in response to the determination that at least a part of the base end image portion PeB displayed on the side of own vehicle relative to the successive point P2 is within the angle of view VA. According to this configuration, the second guidance content CNT2 is started to be displayed in a state where both the front and rear ends of the road segment included in the set traveling route can be shown. Therefore, the user can easily recognize the second guidance content CNT2.

In the present embodiment, the display generation unit 78 deactivates the display of first guidance content CNT1 that is in displayed state before the vehicle A reaches the turning point P1 where the first route guidance is to be performed. Therefore, an object to which attention needs to be paid, such as a pedestrian existing in an area of the turning point P1 is prevented from being blocked by the first guidance content CNT1 that is superimposed on the front view. As described above, the display deactivation of first guidance content CNT1 immediately before the turning point P1 can contribute to the smooth travelling at the turning point P1.

In the present embodiment, on a specific type of road such as an expressway, the display generation unit 78 does not control the display of the second guidance content CNT2 in standby state. On the specific type of road, the display generation unit 78 is configured to start display of the second guidance content CNT2 before deactivating display of the first guidance content CNT1. According to this configuration, when the traveling speed of the vehicle A is high, it is possible to avoid a situation in which the user has a difficulty in securing the time required for recognizing the second guidance content CNT2.

In the present embodiment, after the start of right or left turn at the turning point P1, the traveling direction of the vehicle A is determined using the detection information of the lane marking or the road edge of the connection road Rc detected by the front camera 31 mounted on the vehicle A. Therefore, the display generation unit 78 can obtain the direction of the vehicle A with respect to the connection road Rc in real time, and determine the display start time of the second guidance content CNT2. Based on the above configuration, the HCU 100 can improve the accuracy of the posture determination of the vehicle A, and start the route guidance of the successive point P2 at an appropriate time. Therefore, the risk of misrecognition of route guidance is further reduced.

In the present embodiment, after the start of right or left turn at the turning point P1, the traveling direction of the vehicle A is determined using the (i) map data and the (ii) direction information based on the positioning signal. Therefore, the display generation unit 78 can obtain the direction of the vehicle A relative to the connection road Rc even if the lane marking and the road edge of the connection road Rc are difficult to be detected, and can appropriately control the display start time of the second guidance content CNT2. In this configuration, the behavior direction can be determined without depending on the road environment. Thus, the risk of erroneous recognition of route guidance can be reduced in many driving scenes.

In the present embodiment, as shown in FIG. 12, when no shield BO (see FIG. 9) exists in the roadside area of the connection road Rc, the display start of the second guidance content CNT2 is executed at an early time. In such a scene, even if the superimposed display of the second guidance content CNT2 is started at an early time, erroneous superimposition of the content on the superimposition target does not occur. Therefore, the risk of misrecognition of the driver can be substantially eliminated. Therefore, according to the process that displays the second guidance content CNT2 at an early stage or at an early time based on the absence of the shield BO, the driver can recognize the successive point P2 at an early stage.

In the present embodiment, when the superimposition target of the second guidance content CNT2 is a destination in the roadside area of the connection road Rc, the display of second guidance content CNT2 is started earlier than the case where the superimposition target is an object disposed on the road surface area. According to this configuration, the driver can recognize the successive point P2 at an early stage.

In the above embodiment, the HUD device 20 corresponds to a head-up display, the display generation unit 78 corresponds to a display control unit, and the HCU 100 corresponds to a display control device. The base end image portion PeB corresponds to a near side portion (of the second guidance content), the turning point P1 corresponds to a first guidance point, and the successive point P2 corresponds to the a second guidance point.

Other Embodiments

Although one embodiment of the present disclosure has been described above, the present disclosure is not construed as being limited to the above-mentioned embodiments, and can be applied to various embodiments and combinations within a scope that does not depart from the spirit of the present disclosure.

(First Modification)

Figure 13:
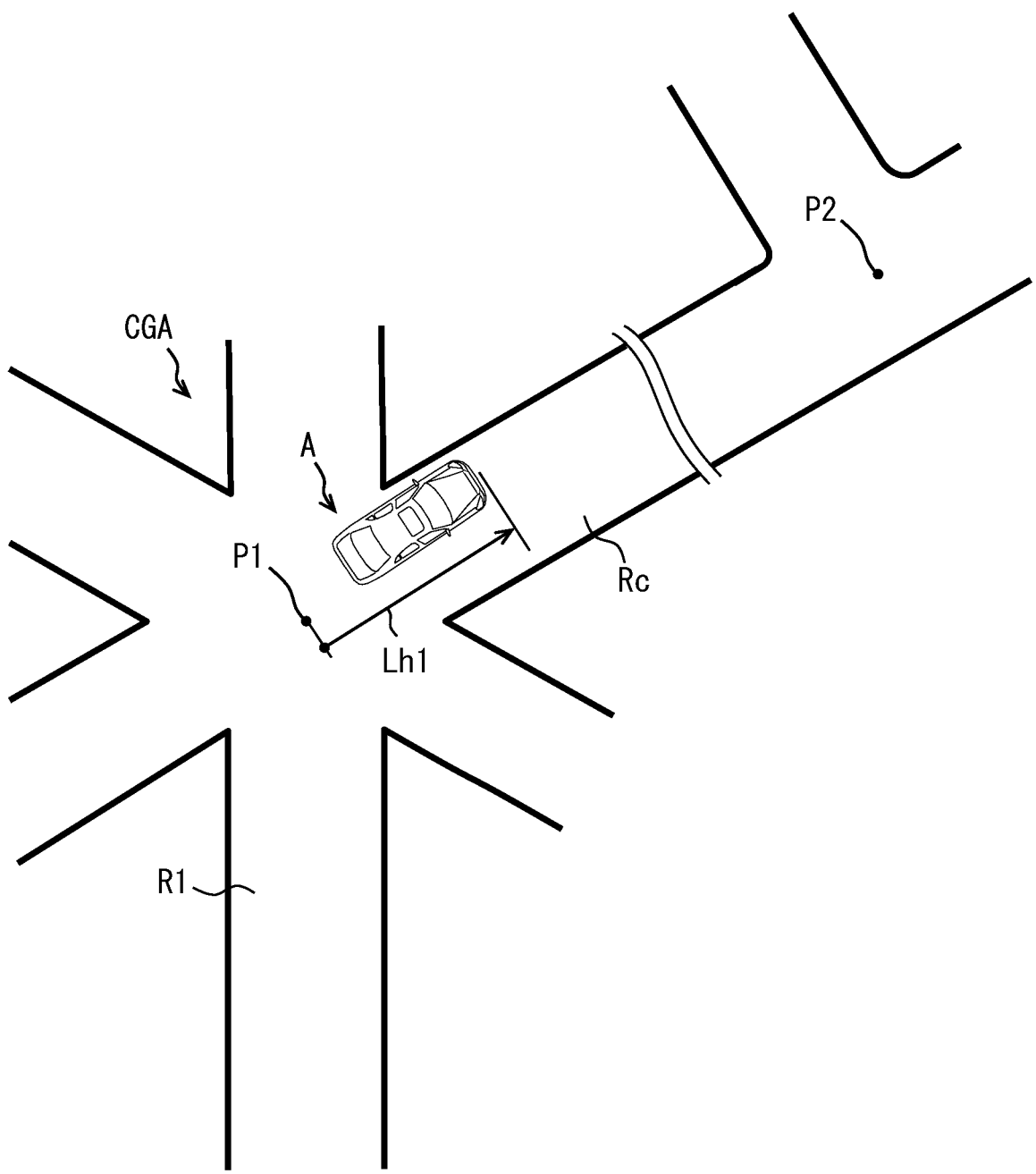
FIG. 13 is a diagram showing an example of a display end time of a first guidance content according to a first modification of the present disclosure.

In the first modification of the above embodiment shown in FIG. 13, the display end time of the first guidance content CNT1 is different from that described in the above embodiment. Within the successive guidance area CGA, the HCU 100 deactivates the display of first guidance content when the vehicle A has traveled the predetermined distance (end distance Lh1) after passing the turning point P1 where the first route guidance is executed. As an example, the HCU 100 deactivates the display of first guidance content CNT1 based on the end distance Lh1, which is defined as a distance from a center of the intersection to the vehicle A and has a value of 10 meters or 50 meters.

In the above first modification, the display of first guidance content CNT1 is continued until the vehicle A entirely passes through the intersection, which is the turning point P1. Therefore, when the turning point P1 is a complicated intersection such as a multi-forked road, the driver can keep tracking the guided exit road to the end of the intersection. According to this configuration, the superimposed display of successive guidance can make the user easily recognize the route guidance. As described above, there are various types of guidance points, such as a simple intersection, a crossroad, or a complex intersection. Thus, the display end time of the first guidance content CNT1 can be controlled to be changed according to the type of guidance point based on the type information included in the route guidance information.

The HCU 100 starts display of second guidance content CNT2 at a time when the distance from the vehicle A to the successive point P2 becomes shorter than the predetermined distance after the display of first guidance content CNT1 is ended. In the first modification, the display of second guidance content CNT2 may be started immediately after the display end of first guidance content CNT1 in continuous manner.

(Second Modification)

Figure 14:
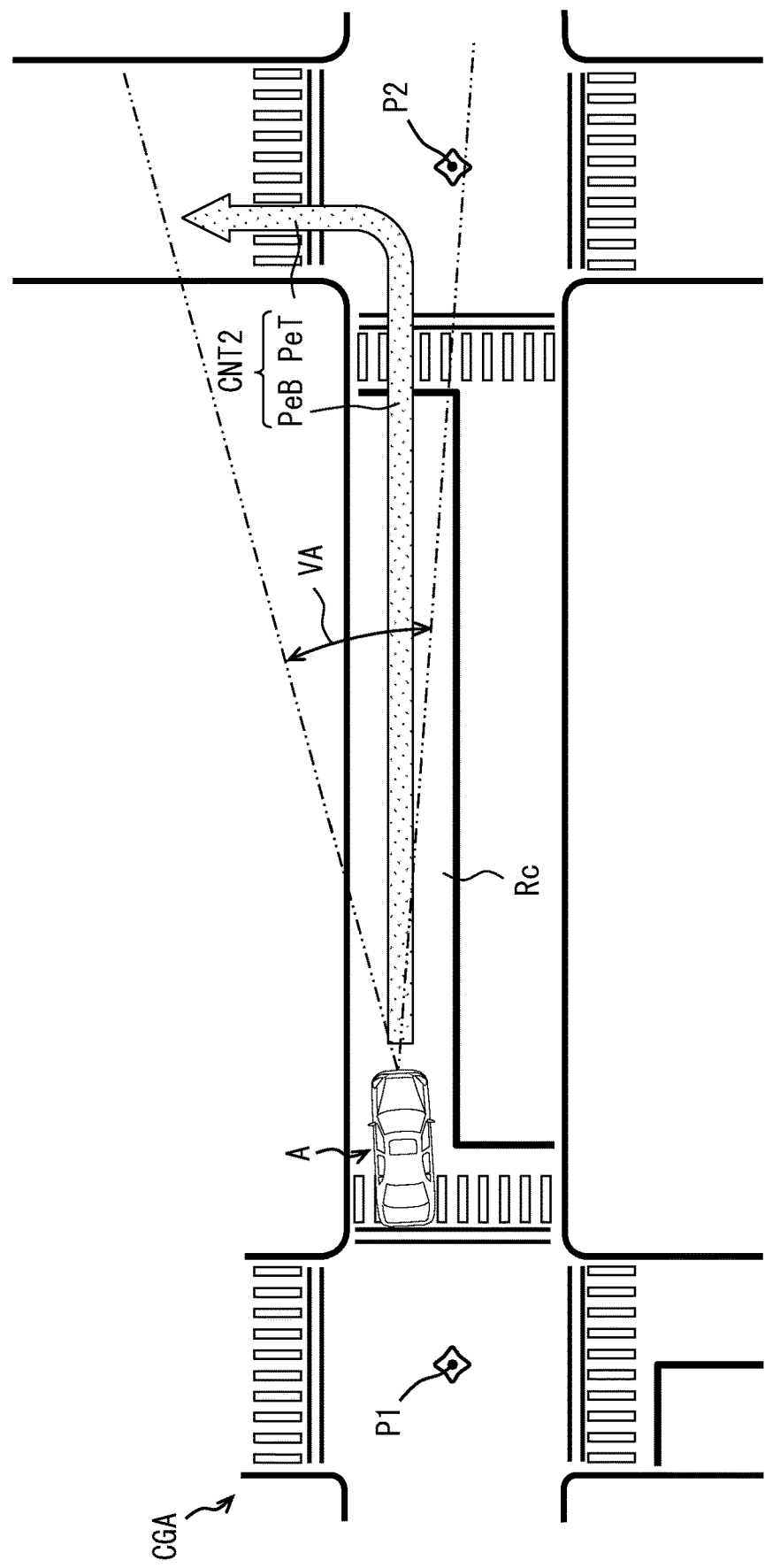
FIG. 14 is a diagram showing an example of a display start time of a second guidance content according to a second modification of the present disclosure.
Figure 15:
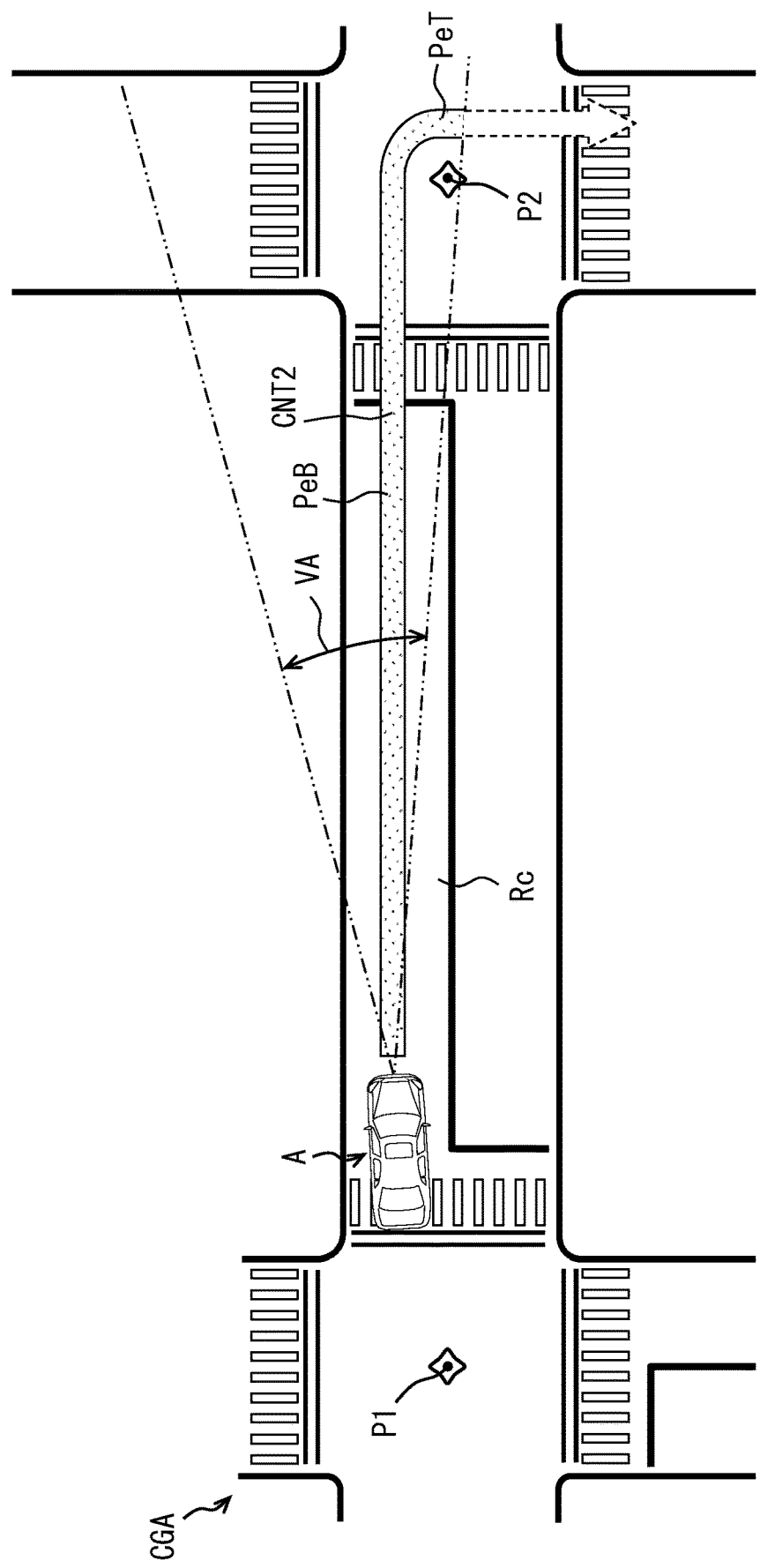
FIG. 15 is a diagram showing a right turn at a successive points.

In the second modification of the above embodiment shown in FIG. 14 and FIG. 15, the display of second guidance content CNT2 is different from that described in the above embodiment. In the second modification, the second guidance content CNT2 is an arrow-shaped content indicating the set traveling route of the vehicle A. In the second guidance content CNT2, an image portion superimposed on the road surface of the connection road Rc corresponds to the base end image portion PeB. In the second guidance content CNT2, an image portion superimposed on the road surface range of the set traveling direction extending from the successive point P2 corresponds to the tip end image portion PeT.

In the second modification, the display end time of first guidance content CNT1 and the display start time of second guidance content CNT2 are different from the above-described embodiment. Within the successive guidance area CGA, the HCU 100 deactivates the display of first guidance content when the vehicle A has passed the turning point P1 where the first route guidance is executed.

After passing the turning point P1, the HCU 100 starts display of second guidance content CNT2 based on the determination that the successive point P2 where the second route guidance is to be executed is within the angle of view VA. Similar to the above embodiment, the HCU 100 obtains the positional relationship between the angle of view VA and the successive point P2 in the virtual space based on the result of the layout simulation in the virtual space using the 3D object (see S23 in FIG. 4). Then, the successive point P2 is determined whether positioned within the angle of view VA.

In the second modification, the display start time of second guidance content CNT2 is waited until the successive point P2 enters the angle of view VA. Therefore, the tip end image portion PeT and the base end image portion PeB of the second guidance content CNT2 are connected with one another without displaying only the very tip of the tip end image portion PeT during the right or left turn of the vehicle at the turning point P1. Therefore, the second guidance content CNT2 can be displayed to the driver in an easy-understanding manner.

In the second modification, even in the scene of turning right at the successive point P2 (see FIG. 15), the display of second guidance content CNT2 is started in a manner that the base end image portion PeB is displayed together with a part of the tip end image portion PeT. That is, the second guidance content CNT2 is displayed in a manner that the meaning of the content can be understood by the user. Therefore, the second guidance content CNT2 can be displayed in easy-to-understand manner regardless of the turning direction at the successive point P2.

(Third Modification)

Figure 16:
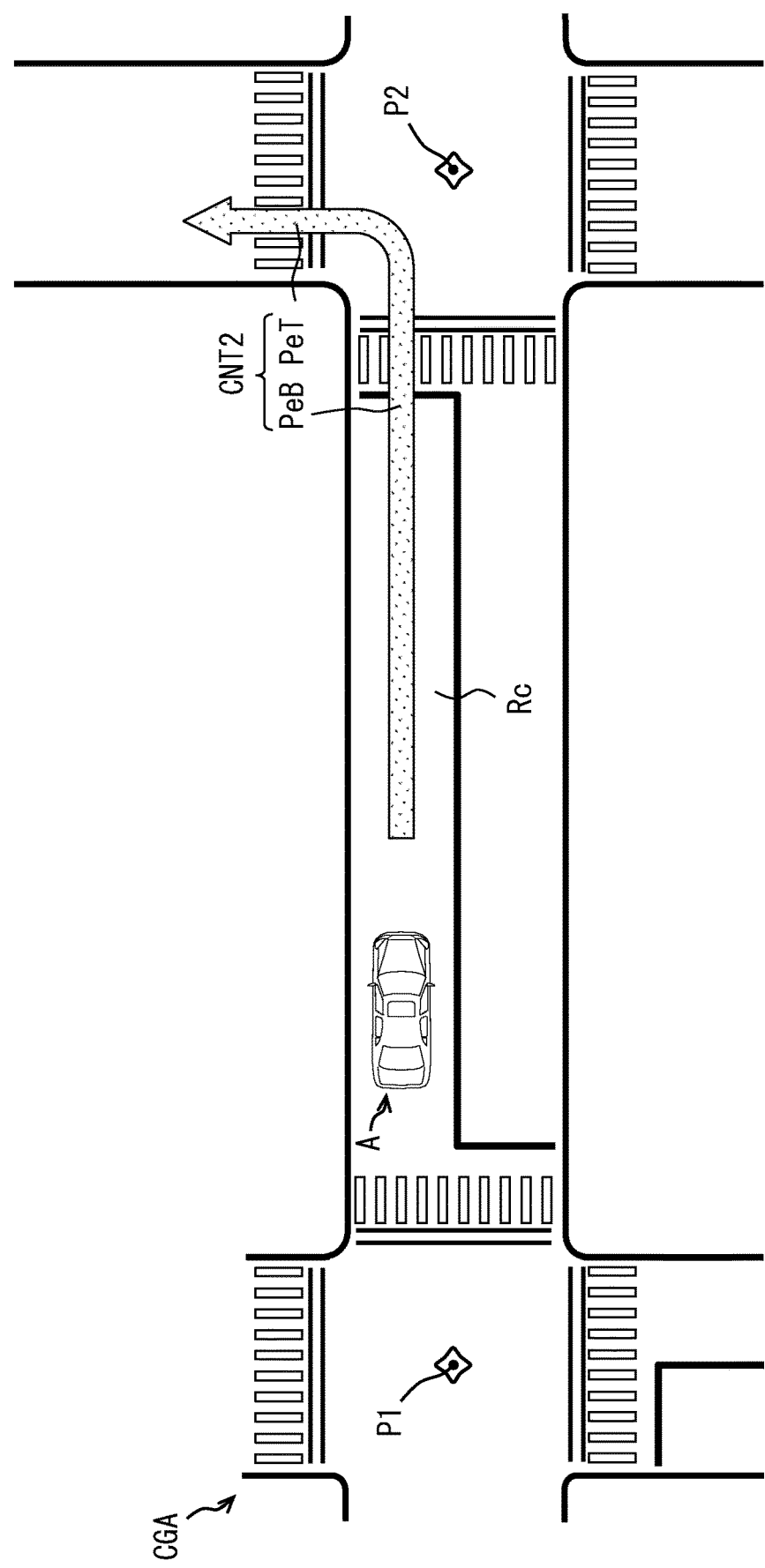
FIG. 16 is a diagram showing an example of a display start time of a second guidance content according to a third modification of the present disclosure.

In the third modification of the above embodiment shown in FIG. 16, the display start time of the second guidance content CNT2 is different from that described in the above embodiment. The HCU 100 starts display of the second guidance content CNT2 based on the estimation that the traveling direction of the vehicle A is oriented in the direction along the connection road Rc toward the successive point P2 where the second route guidance is to be executed. That is, in the third modification, when the turning point P1 and the successive point P2 are successive, the display of second guidance content CNT2 is activated under a condition that a straight-ahead travelling of the vehicle is determined after the start of right or left turn at the turning point P1.

In the third modification, the display generation unit 78 successively acquires the estimation result of traveling direction of the vehicle A from the vehicle posture estimation unit 77. The display generation unit 78 properly uses relative position of the lane marking or the road edge of the connection road Rc, the intersection angle θ1 (see FIG. 5), the posture change angle, the steering angle information for different purposes, and determines whether the vehicle travels straight-ahead after the start of right or left turn at the turning point P1.

The display generation unit 78 determines the straight-ahead travelling of the vehicle at the time when the lane markings or road edges located on the left and right sides of the vehicle A enter the angle of view of the front camera 31 and can be captured by the front camera 31. The display generation unit 78 may determine the straight-ahead travelling of the vehicle at the time when the lane marking on one side or the road edge on one side enters the angle of view of the front camera 31.

In a case where both of the lane markings and the road edges of the connection road Rc cannot detected from the image data captured by the front camera, the display generation unit 78 determines the straight-ahead travelling of the vehicle by combining the map data and the direction information. The display generation unit 78 sets a threshold angle slightly smaller than the intersection angle θ1 with reference to the intersection angle θ1. The display generation unit 78 determines the straight-ahead travelling of the vehicle at the time when the posture change angle in the yaw direction of the vehicle A at the turning point P1 exceeds the threshold angle set in advance.

In a case where it is difficult to detect the lane marking and the road edge of the connection road Rc and a reception environment of the positioning signal is in bad state, the display generation unit 78 determines the traveling direction using the steering angle information. The display generation unit 78 monitors the change of the steering operation at the turning point P1 based on the steering angle information. When the steering angular velocity decreases lower than a predetermined speed, that is, at the time when the change in the steering angle becomes smooth, the display generation unit 78 determines the straight-ahead travelling of the vehicle.

The display generation unit 78 may determine the straight-ahead travelling of the vehicle at the time when the steering angle becomes less than a predetermined threshold value during a returning operation of the steering based on the steering angle information. In this case, the predetermined threshold value for determining the straight-ahead travelling may be properly changed according to the intersection angle θ1 and the shape of the connection road Rc based on the map data.

In the third modification, the display of second guidance content CNT2 is started when front end image portion PeT and the base end image portion PeB are connected with one another. Therefore, the second guidance content CNT2 can be displayed to the driver in an easy-understanding manner.

In the third modification, the traveling direction of the vehicle A is determined using the detection information of the lane marking or the road edge of the connection road Rc detected by the front camera 31 mounted on the vehicle A. Therefore, the display generation unit 78 can obtain the direction of the vehicle A with respect to the connection road Rc in real time, and determine the display start time of the second guidance content CNT2. According to this configuration, the HCU 100 can improve the determination accuracy of the straight-ahead travelling of the vehicle A, and properly control the display start time of the second guidance content CNT2.

In the third modification, the traveling direction of the vehicle A is determined using (i) the map data and (ii) the direction information based on the positioning signal. Therefore, the display generation unit 78 can obtain the direction of the vehicle A relative to the connection road Rc even if the lane marking and the road edge of the connection road Rc are difficult to be detected, and can determine the display start time of the second guidance content CNT2. According to this configuration, since the straight-ahead travelling of the vehicle can be determined without depending on the road environment, the display start time of the second guidance content CNT2 can be properly controlled in most of driving scenes.

In the third modification, the traveling direction of the vehicle A can be determined using the steering angle information. In this configuration, under a condition that an end of the right or left turn of the vehicle A is determined based on the own vehicle information, the display generation unit 78 can determine the display start time of second guidance content CNT2 without being affected by the external environment of the vehicle A. With this configuration, the display start time of second guidance content CNT2 can be properly controlled in most of driving scenes.

The conditions for determining the straight-ahead travelling of the vehicle in the third modification may be properly changed as appropriate. As an example, the display generation unit 78 may determine the straight-ahead travelling of the vehicle based on at least one of a traveling direction determined based on detection information, a traveling direction determined using map data and direction information, or a traveling direction determined using steering angle information. After determining the straight-ahead travelling of the vehicle based on at least one of the three directions, the display generation unit 78 may start display of the guidance content CNT2. As another example, the display generation unit 78 may determine the straight-ahead travelling of the vehicle based on the majority decision of above-described three traveling direction determinations. As yet another example, the display generation unit 78 may be configured to determine a part of the three traveling direction determination methods.

(Fourth Modification)

Figure 17:
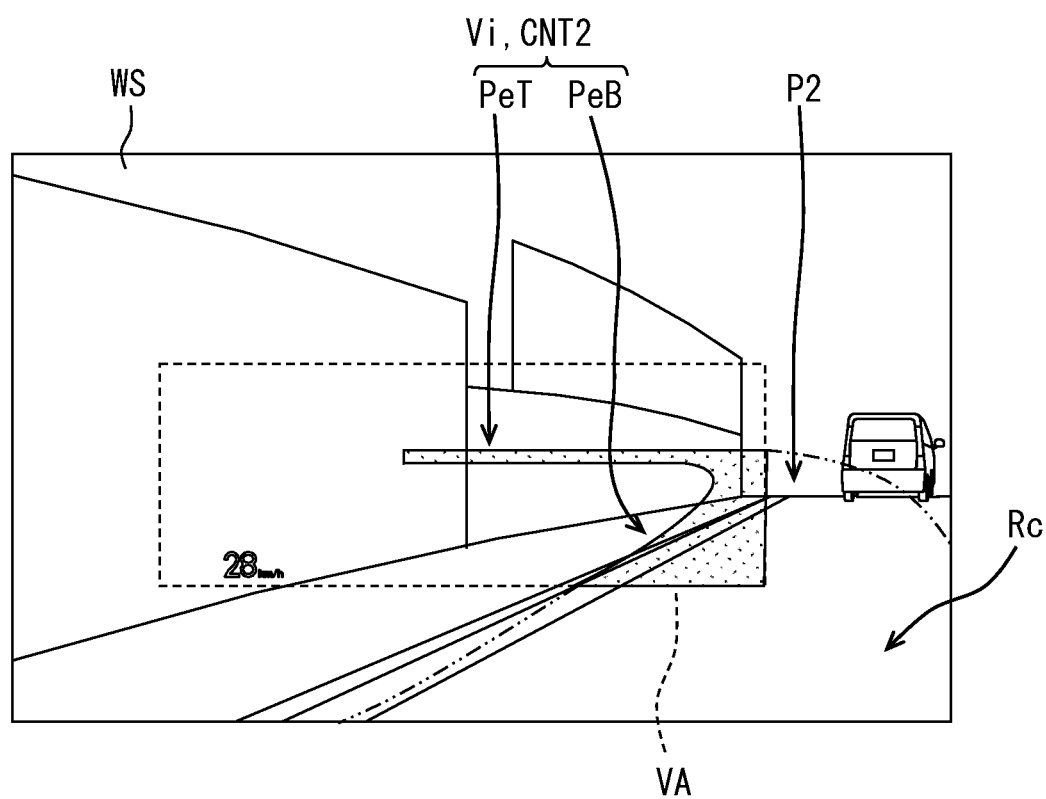
FIG. 17 is a diagram showing an example of a second guidance content according to a fourth modification of the present disclosure.

As shown in FIG. 17, the HCU 100 in the fourth modification displays the second guidance content in different manner from the first guidance content by intentionally extending the overlapping range of the second guidance content CNT2 to the outside of the road surface. In this display mode, the second guidance content CNT2 is likely to be displayed in a manner that the end image portion PeT and the base end image portion PeB are connected with one another. As a result, the expansion of the second guidance content CNT2 enables the integrated display of the tip end image portion PeT and the base end image portion PeB at an early stage, and can contribute to the easy-to-understand display of the guidance route at the successive point P2.

As the fifth modification of the above embodiment, the HCU 100 starts display of the second guidance content CNT2 when at least a part of the second guidance content CNT2 is in the angle of view VA. As the sixth modification of the above embodiment, in the case of successive guidance, the HCU 100 switches the display of first guidance content CNT1 to the display of second guidance content CNT2 at a point (time point) where the vehicle has traveled a predetermined distance after passing the turning point P1. The display start time and the display end time of each of the guidance contents CNT1 and CNT2 may be appropriately changed among the times described in the above embodiment and modifications. Specifically, the display start time of the second guidance content CNT2 may be set when the user has passed the turning point P1 or when the user has traveled a predetermined distance after passing the turning point P1.

As the seventh modification of the above embodiment, the successive guidance determination unit 75, instead of the navigation ECU 53, determines whether multiple guidance points are successive points. For example, when the navigation ECU 53 does not output the successive guidance notification, the successive guidance determination unit 75 may determine whether to perform successive guidance based on other route guidance information acquired from the navigation ECU 53.

As an example, when the successive guidance determination unit 75 determines that information related to multiple guidance points are included in a set of route guidance information transmitted together with the guidance execution request, the successive guidance determination unit 75 may determines existence of successive guidance information, and determine execution of successive guidance about the multiple guidance points. As another example, the successive guidance determination unit 75 may calculate the distance between the turning point P1 and the successive point P2 positioned along the set route based on the route guidance information that is successively acquired. The successive guidance determination unit 75 determines that the turning point P1 and the successive point P2 are successive, that is, existence of successive guidance information, using similar determination logic as the navigation ECU 53 described above.

The distance between adjacent two points, which is a threshold value for determining execution of successive guidance, may be appropriately set within, for example, a range of 100 meters to 1000 meters. Such a distance between two adjacent points may be adjustable by a user of the vehicle A, such as a driver, or may be automatically adjusted according to the type of successive point P2.

In the above embodiment, when there is no specific object such as a shield BO in the roadside area of the connection road Rc, the display switch to the next guidance content CNT2 is started at an early stage. The specific type of such a specific object is not limited to the above-mentioned shield BO, and may be appropriately changed depending on, for example, the guidance content CNT2. Further, the process of recognizing a specific object may be performed by the peripheral monitoring sensor 30 or the driving support ECU 57, or may be performed by the external information acquisition unit 74 or the roadside object determination unit 76.

As an eighth modification of the above embodiment, a user terminal such as a smartphone may be connected to the in-vehicle network 1. In the application executed on the user terminal, a route to the destination may be set by an operation made by a user, such as a driver. The user terminal provides the route information to the destination, the related navigation map data, and the like to the route information acquisition unit 71 through the in-vehicle network or the like. The route guidance information may include successive guidance notification.

As a ninth modification of the above embodiment, the route information acquisition unit 71 may acquire route information, navigation map data, or the like from a server on the cloud through an external network provided outside of the vehicle. The navigation device 50 may not be fixed to the vehicle A in advance under a condition that the information necessary for route guidance can be acquired from the smartphone or the cloud server as in the above-described eighth modification and ninth modification.

The display mode of the route guidance content CNTg may be appropriately changed in order to improve the recognition by the driver. As an example, the route guidance content CNTg may be displayed such that a brightness of the route guidance content decreases as a distance from the own vehicle to the corresponding guidance point increases. In the tip end image portion PeT of the route guidance content CNTg, a portion that overlaps with the shield BO may have a lower brightness than a brightness of a portion that does not overlap with the shield BO. With a distance from the own vehicle to the guidance point increases, the route guidance content superimposed on the guidance point may be shown in a manner that the content floats from the road surface so that a far distant portion is viewed in the enlarged size.

In the above-described embodiment, the display control function provided by the HCU 100 may be provided by another in-vehicle ECU mounted on the vehicle A. As an example, the display control function may be installed to the navigation ECU 53 of the navigation device 50. As another example, the display control function may be installed to the control circuit of the HUD device 20. Further, the HCU 100 may be an electronic control device mounted on the vehicle A as a meter ECU. Alternatively, the HCU 100 may include the function of the navigation ECU 53 and control the route guidance display by the navigation display 52 together with the virtual image display by the HUD device 20.

The specific configuration of the projector of the HUD device used in the superimposed display may be changed as appropriate. As a tenth modification, the HUD device may be provided with an electro luminescence (EL) panel instead of the LCD panel and the backlight. Further, instead of the EL panel, a projector using a display such as a plasma display panel, a cathode ray tube and an LED can be adopted as the display device of the HUD device.

As an eleventh modification, the HUD device is provided with a laser module (hereinafter referred to as LSM) and a screen instead of the LCD and the backlight. The LSM includes, for example, a laser light source, a MEMS (Micro Electro Mechanical Systems) scanner, and the like. The screen is, for example, a micromirror array or a microlens array. As a twelfth modification, in the HUD device 20, a display image is drawn on the screen by scanning the laser beam emitted from the LSM. The HUD device 20 projects the display image drawn on the screen onto the windshield by the magnifying optical element, and displays the virtual image in the space.

As a thirteenth modification, the HUD device is provided with a DLP (Digital Light Processing, registered trademark) projector. The DLP projector has a digital mirror device (hereinafter referred to as DMD) provided with a large number of micromirrors, and a projection light source that projects light toward the DMD. The DLP projector draws a display image on the screen under the control of linking the DMD and the projection light source.

As a fourteenth modification, the HUD device adopts the projector using LCOS (Liquid Crystal On Silicon). As a fifteenth modification, a holographic optical element is adopted in the HUD device as one of the optical systems for displaying the virtual image Vi in the space.

In the aforementioned embodiments, the respective functions provided by the HCU can be also provided by software and hardware for executing the software, only software, only hardware, and complex combinations of software and hardware. In cases where these functions are provided by electronic circuits as hardware, the respective functions can be also provided by analog circuits or digital circuits which include a large number of logic circuits.

Further, the specific implementation of the storage medium for storing the program or the like capable of executing the above-described display control method may be changed as appropriate. For example, the storage medium is not limited to the configuration provided on the circuit board, and may be provided in the form of a memory card or the like. The storage medium may be inserted into a slot portion, and electrically connected to the control circuit of the HCU. The storage medium may include an optical disk which forms a source of programs to be copied into a HCU, a hard disk drive therefor, and the like.

The vehicle equipped with the HMI system is not limited to a general private car, but may be a rented vehicle, a vehicle for man-driving taxi, a vehicle for sharing vehicle service, a freight vehicle, a bus, or the like. The HMI system and the HCU may be mounted on a vehicle dedicated to unmanned driving used for mobility services.

The control unit and the method thereof which have been described in the present disclosure may be also implemented by a special purpose computer which includes a processor programmed to execute one or more functions implemented by computer programs. Alternatively, the control unit and the control method described in the present disclosure may be implemented by a special purpose hardware logic circuit. Alternatively, the control unit and the control method described in the present disclosure may be implemented by one or more special purpose computers configured by a combination of a processor executing a computer program and one or more hardware logic circuits. The computer programs may be stored, as instructions to be executed by a computer, in a tangible non-transitory computer-readable storage medium.

According to another aspect, the present disclosure provides a display control device which is applied to a vehicle and controls a superimposed display of a content on a front view of the vehicle for route guidance.

The display control device includes a successive guidance determination unit that determines whether guidance information used in the route guidance includes successive guidance information. The successive guidance information indicates a turning point where the vehicle is guided to make a right or left turn is successive with a successive point where the vehicle is guided after passing the turning point.

The display control device includes a vehicle posture estimation unit that estimates a direction of the vehicle with respect to a travelling road of the vehicle, and determines whether the direction of the vehicle satisfies a condition of displaying a guidance content for guiding the successive point.

The display control device includes a display control unit. When determining that the guidance information includes the successive guidance information, the display control unit displays a turning content that guides the turning point. After displaying the turning content that guides the turning point, when the direction of the vehicle satisfies the condition of displaying the guidance content for guiding the successive point, the display control unit starts display of the guidance content.

The vehicle posture estimation unit may determine that the direction of the vehicle satisfies the condition of displaying the guidance content for guiding the successive point based on detection information of a road lane marking or a road edge detected by an external sensor.

The vehicle posture estimation unit may determine that the direction of the vehicle satisfies the condition of displaying the guidance content for guiding the successive point based on (i) map information related to the travelling road of the vehicle and (ii) direction information of the vehicle specified based on positioning signals received from positioning satellites.

The vehicle posture estimation unit may determine that the direction of the vehicle satisfies the condition of displaying the guidance content for guiding the successive point based on steering information related to a steering angle of the vehicle.

The display control device may further include a roadside object determination unit which determines whether a specific object, which is not suitable to be set as a target for superimposing the guidance content, exists in a roadside area of the travelling road of the vehicle after the vehicle makes a turn at the turning point.

The display of guidance content is started earlier in a case where the specific objection does not exist in the roadside area compared with a case where the specific object exists in the roadside area.

The vehicle posture estimation unit relaxes a criterion for determining whether the guidance content is able to be displayed in a case where a superimposition target on which the guidance content is superimposed is positioned in a roadside area of the road compared with a case where the superimposition target is positioned on a road surface of the road.

The present disclosure provides a display control program which is applied to a vehicle and controls a superimposed display of a content on a front view of the vehicle for route guidance.

The display control program product includes instructions to be executed by at least one processor. The instructions include: determining whether guidance information used in the route guidance includes successive guidance information. The successive guidance information indicates a turning point where the vehicle is guided to make a right or left turn is successive with a successive point where the vehicle is guided after passing the turning point; estimating a direction of the vehicle with respect to a travelling road of the vehicle, and determining whether the direction of the vehicle satisfies a condition of displaying a guidance content for guiding the successive point; and when determining that the guidance information includes the successive guidance information, displaying a turning content that guides the turning point, and then starting display of the guidance content in response to the direction of the vehicle satisfying the condition of displaying the guidance content for guiding the successive point.

According to the above configuration, when the turning point and the guidance points successively exist, the display of guidance content that guides the successive guidance point is started after the vehicle makes a right or left turn at the turning point and the vehicle is determined to be faced in a direction where the guidance content of the successive guidance point can be displayed. Based on this configuration, the display start time of guidance content that successively guides the guidance points can be set in appropriate manner. Therefore, the risk of erroneous recognition due to the superimposed display for route guidance can be avoided.

It is noted that a flowchart or the process of the flowchart in the present disclosure includes multiple steps (also referred to as sections), each of which is represented, for example, as S101. Further, each step can be divided into several sub-steps while several steps can be combined into a single step.

While various embodiments, configurations, and aspects of the display system, the display control device, and the display control program according to the present disclosure have been exemplified, the embodiments, configurations, and aspects of the present disclosure are not limited to those described above. For example, embodiments, configurations, and examples obtained from an appropriate combination of technical elements disclosed in different embodiments, configurations, and examples are also included within the scope of the embodiments, configurations, and examples of the present disclosure.

What is claimed is:

1. A display system applied to a vehicle, the display system comprising:
   a navigation device guiding a route to a destination; and
   a display control device displaying, based on route guidance information acquired from the navigation device, a plurality of route guidance contents by superimposing the plurality of route guidance contents on a road surface with a head-up display,
   wherein,
   the route guidance information acquired from the navigation device includes a first route guidance and a second route guidance,
   the plurality of route guidance contents include a first guidance content corresponding to the first route guidance and a second guidance content corresponding to the second route guidance,
   when the navigation device determines that the first route guidance and the second route guidance are successive guidance that indicates a first guidance point to make a right or left turn and a successive second guidance point to make a right or left turn, the navigation device concurrently activates a display of a first guidance image corresponding to the first route guidance and a display of a second guidance image corresponding to the second route guidance, and
   when the navigation device determines that the first route guidance and the second route guidance are successive guidance that indicates the first guidance point to make a right or left turn and the successive second guidance point to make a right or left turn, the display control device, using the head-up display:

(i) activates a display of the first guidance content that performs the first route guidance;
(ii) deactivates the display of the first guidance content; and then
(iii) activates a display of the second guidance content that performs the second route guidance.

2. The display system according to claim 1, wherein each of the first guidance content and the second guidance content includes information indicating the route.

3. The display system according to claim 1, wherein the display control device:
sets a display position of the second guidance content to include the successive second guidance point that is a guidance target of the second route guidance; and
after the vehicle enters an intersection where the first route guidance is executed, starts the display of the second guidance content under a condition that at least a part of a portion of the second guidance content displayed close to an own vehicle with respect to the successive second guidance point is determined to be within an angle of view of the head-up display in a state where the second guidance content is superimposed on the set display position.

4. The display system according to claim 1, wherein a guidance target of the second route guidance corresponds to the successive second guidance point, and
after the vehicle enters an intersection where the first route guidance is executed, the display control device starts the display of the second guidance content under a condition that the successive second guidance point is determined to be within an angle of view of the head-up display.

5. The display system according to claim 1, wherein a guidance target of the first route guidance corresponds to the first guidance point,
a guidance target of the second route guidance corresponds to the successive second guidance point, and
the display control device changes a display start time of the second guidance content according to a distance between the first guidance point and the successive second guidance point.

6. The display system according to claim 1, wherein the display control device displays the second guidance content in a different manner from the first guidance content.

7. The display system according to claim 1, wherein the display control device displays the second guidance content at a different position from a display position of the first guidance content.

8. A display system applied to a vehicle, the display system comprising:
a navigation device guiding a route to a destination; and
a display control device displaying, based on route guidance information acquired from the navigation device, a plurality of route guidance contents by superimposing the plurality of route guidance contents on a road surface with a head-up display,
wherein,
the route guidance information acquired from the navigation device includes a first route guidance and a second route guidance,
the plurality of route guidance contents include a first guidance content corresponding to the first route guidance and a second guidance content corresponding to the second route guidance,
when the navigation device determines that the first route guidance and the second route guidance are successive guidance that indicates a first guidance point to make a right or left turn and a successive second guidance point to make a right or left turn, the navigation device concurrently starts the first route guidance and the second route guidance,
a guidance target of the second route guidance corresponds to the successive second guidance point, and
when the navigation device determines that the first route guidance and the second route guidance are successive guidance that indicates the first guidance point to make a right or left turn and the successive second guidance point to make a right or left turn, the display control device:
(i) activates a display of the first guidance content that performs the first route guidance;
(ii) deactivates the display of the first guidance content; and then
(iii) activates a display of the second guidance content that performs the second route guidance under a condition that a travelling direction of the vehicle is determined to face a direction along which a road extends toward the successive second guidance point.

9. A display system applied to a vehicle, the display system comprising:
a navigation device guiding a route to a destination; and
a display control device displaying, based on route guidance information acquired from the navigation device, a plurality of route guidance contents by superimposing the plurality of route guidance contents on a road surface with a head-up display,
wherein,
the route guidance information acquired from the navigation device includes a first route guidance and a second route guidance,
the plurality of route guidance contents include a first guidance content corresponding to the first route guidance and a second guidance content corresponding to the second route guidance,
when the navigation device determines that the first route guidance and the second route guidance are successive guidance that indicates a first guidance point to make a right or left turn and a successive second guidance point to make a right or left turn, the navigation device concurrently starts the first route guidance and the second route guidance,
when the navigation device determines that the first route guidance and the second route guidance are successive guidance that indicates the first guidance point to make a right or left turn and the successive second guidance point to make a right or left turn, the display control device:
(i) activates a display of the first guidance content that performs the first route guidance;
(ii) deactivates the display of the first guidance content; and then
(iii) activates a display of the second guidance content that performs the second route guidance, and
when a type of a road corresponding to the route guidance is a specific type road, the display control device activates the display of the second guidance content before deactivating the display of the first guidance content.

10. A display control device applied to a vehicle equipped with a navigation device, the display control device controlling a superimposed display of a content on a road surface using a head-up display, the display control device comprising:
    a route information acquisition unit acquiring route guidance information from the navigation device of the vehicle, the navigation device providing a route guidance to a destination, the route guidance information acquired from the navigation device including a first route guidance and a second route guidance; and
    a display control unit displaying a plurality of route guidance contents generated based on the route guidance information by superimposing the plurality of route guidance contents on the road surface using the head-up display, the plurality of route guidance contents including a first guidance content corresponding to the first route guidance and a second guidance content corresponding to the second route guidance,
    wherein,
    when the navigation device determines that the first route guidance and the second route guidance are successive guidance that indicates a first guidance point to make a right or left turn and a successive second guidance point to make a right or left turn,
        (i) the navigation device concurrently activates a display of a first guidance image corresponding to the first route guidance and a display of a second guidance image corresponding to the second route guidance, and
        (ii) the route information acquisition unit acquires the route guidance information that indicates an existence of the successive guidance that indicates the first guidance point to make a right or left turn and the successive second guidance point to make a right or left turn, and
    in response to the route information acquisition unit acquiring the route guidance information indicating the existence of the successive guidance that indicates the first guidance point to make a right or left turn and the successive second guidance point to make a right or left turn, within a successive guidance area where the navigation device concurrently displays the first guidance image and the second guidance image, the display control unit:
        (i) activates a display of the first guidance content that performs the first route guidance,
        (ii) deactivates the display of the first guidance content; and then
        (iii) activates a display of the second guidance content that performs the second route guidance.

11. A display control device applied to a vehicle equipped with a navigation device, the display control device controlling a superimposed display of a content on a road surface using a head-up display, the display control device comprising:
    a route information acquisition unit acquiring route guidance information from the navigation device of the vehicle, the navigation device providing a route guidance to a destination, the route guidance information acquired from the navigation device including a first route guidance and a second route guidance; and
    a display control unit displaying a plurality of route guidance contents generated based on the route guidance information by superimposing the plurality of route guidance contents on the road surface using the head-up display, the plurality of route guidance contents including a first guidance content corresponding to the first route guidance and a second guidance content corresponding to the second route guidance,
    wherein,
    a guidance target of the second route guidance corresponds to a successive second guidance point,
    when the navigation device determines that the first route guidance and the second route guidance are successive guidance that indicates a first guidance point to make a right or left turn and the successive second guidance point to make a right or left turn,
        (i) the navigation device concurrently starts the first route guidance and the second route guidance, and
        (ii) the route information acquisition unit acquires the route guidance information that indicates an existence of the successive guidance that indicates the first guidance point to make a right or left turn and the successive second guidance point to make a right or left turn, and
    in response to the route information acquisition unit acquiring the route guidance information indicating the existence of the successive guidance that indicates the first guidance point to make a right or left turn and the successive second guidance point to make a right or left turn, within a successive guidance area where the navigation device concurrently starts the first route guidance and the second route guidance, the display control unit:
        (i) activates a display of the first guidance content that performs the first route guidance,
        (ii) deactivates the display of the first guidance content; and then
        (iii) activates a display of the second guidance content that performs the second route guidance under a condition that a travelling direction of the vehicle is determined to face a direction along which a road extends toward the successive second guidance point.

12. A display control program product stored in a computer-readable non-transitory storage medium, the display control program product being applied to a vehicle which is equipped with a navigation display and controlling a superimposed display of a content on a road surface using a head-up display, the display control program product comprising instructions to be executed by a processor for:
    acquiring route guidance information to provide a route guidance to a destination, the route guidance information including a first route guidance and a second route guidance;
    determining whether the first route guidance and the second route guidance to be provided by the navigation display are successive guidance that indicates a first guidance point to make a right or left turn and a successive second guidance point to make a right or left turn, based on the route guidance information;
    displaying a plurality of route guidance contents generated based on the route guidance information by superimposing the plurality of route guidance contents on a road surface using the head-up display, the plurality of route guidance contents including a first guidance content corresponding to the first route guidance and a second guidance content corresponding to the second route guidance; and
    when determining that the first route guidance and the second route guidance are the successive guidance that indicates the first guidance point to make a right or left turn and the successive second guidance point to make a right or left turn, within a successive guidance area where the navigation display concurrently activates a display of a first guidance image corresponding to the first route guidance and a display of a second guidance image corresponding to the second route guidance,
  (i) activating a display of the first guidance content that performs the first route guidance,
  (ii) deactivating the display of the first guidance content, and then
  (iii) activating a display of the second guidance content that performs the second route guidance.

13. A display control program product stored in a computer-readable non-transitory storage medium, the display control program product being applied to a vehicle which is equipped with a navigation display and controlling a superimposed display of a content on a road surface using a head-up display, the display control program product comprising instructions to be executed by a processor for:

acquiring route guidance information to provide a route guidance to a destination, the route guidance information including a first route guidance and a second route guidance;

determining whether the first route guidance and the second route guidance to be provided by the navigation display are successive guidance that indicates a first guidance point to make a right or left turn and a successive second guidance point to make a right or left turn based on the route guidance information;

displaying a plurality of route guidance contents generated based on the route guidance information by superimposing the plurality of route guidance contents on a road surface using the head-up display, the plurality of route guidance contents including a first guidance content corresponding to the first route guidance and a second guidance content corresponding to the second route guidance, a guidance target of the second route guidance corresponding to the successive second guidance point; and when determining that the first route guidance and the second route guidance are the successive guidance that indicates the first guidance point to make a right or left turn and the successive second guidance point to make a right or left turn, within a successive guidance area where the navigation display concurrently starts the first route guidance and the second route guidance,
    (i) activating a display of the first guidance content that performs the first route guidance,
    (ii) deactivating the display of the first guidance content, and then
    (iii) activating a display of the second guidance content that performs the second route guidance under a condition that a travelling direction of the vehicle is determined to face a direction along which a road extends toward the successive second guidance point.

\* \* \* \* \*